(12) United States Patent
Watanabe

(10) Patent No.: US 7,102,780 B2
(45) Date of Patent: Sep. 5, 2006

(54) DATA COMMUNICATION APPARATUS, IMAGE FORMING APPARATUS MANAGEMENT SYSTEM USING THE DATA COMMUNICATION APPARATUS AND COUNTER INFORMATION TRANSMISSION METHOD THEREFOR

(75) Inventor: Hidehiko Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1015 days.

(21) Appl. No.: 10/141,875

(22) Filed: May 10, 2002

(65) Prior Publication Data

US 2002/0191215 A1    Dec. 19, 2002

(30) Foreign Application Priority Data

May 11, 2001    (JP)    ............................. 2001-142332

(51) Int. Cl.
   *G06F 15/00*    (2006.01)
(52) U.S. Cl. ........................................ 358/1.15; 399/79
(58) Field of Classification Search .................. 399/79
   See application file for complete search history.

(56) References Cited

U.S. PATENT DOCUMENTS 5,512,979 A * 4/1996 Ogura ............................ 399/8
5,890,029 A * 3/1999 Hirata et al. .................... 399/8

OTHER PUBLICATIONS

U.S. Appl. No. 09/658,566, filed Sep. 8, 2000.
U.S. Appl. No. 09/771,883, filed Jan. 30, 2001.
U.S. Appl. No. 09/874,994, filed Jun. 7, 2001.

* cited by examiner

*Primary Examiner*—Joseph R. Pokrzywa
*Assistant Examiner*—Athanasios Papanikolaou
(74) *Attorney, Agent, or Firm*—Oblon, Spivak, McClelland, Maier & Neustadt, P.C.

(57) ABSTRACT

A data communication apparatus regularly obtains counter information from a plurality of image forming apparatuses. Then, the data communication apparatus moves and writes the counter information that is in a first memory and obtained at a previous time to a second memory. Thereafter, the counter information obtained this time is written to the first memory. At the same time, the data communication apparatus compares the counter information obtained this time with the counter information obtained the previous time. When there is a contradiction between both sets of counter information, the counter information is determined to be a counter abnormality and transmitted to a central management apparatus.

18 Claims, 16 Drawing Sheets

FIG.5

PARAMETERS IN DATA COMMUNICATION APPARATUS

| No. | PARAMETER NAME |
|---|---|
| 1 | TELEPHONE NUMBER FOR SC/MC |
| 2 | WAITING TIME FOR REDIALING FOR SC/MC |
| 3 | NUMBER OF TIMES OF REDIALING FOR SC/MC |
| 4 | TELEPHONE NUMBER FOR ALARM CALL |
| 5 | WAITING TIME FOR REDIALING FOR ALARM CALL |
| 6 | NUMBER OF TIMES OF REDIALING FOR ALARM CALL |
| 7 | TELEPHONE NUMBER FOR BLOCK BILLING |
| 8 | WAITING TIME FOR REDIALING FOR BLOCK BILLING |
| 9 | NUMBER OF TIMES OF REDIALING FOR BLOCK BILLING |
| 10 | PPC MODEL NUMBER OF DEVICE ADDRESS 0 |
| 11 | PPC MODEL NUMBER OF DEVICE ADDRESS 1 |
| 12 | PPC MODEL NUMBER OF DEVICE ADDRESS 2 |
| 13 | PPC MODEL NUMBER OF DEVICE ADDRESS 3 |
| 14 | PPC MODEL NUMBER OF DEVICE ADDRESS 4 |
| 15 | COUNTER CLOSING DAY OF DEVICE ADDRESS 0 |
| 16 | COUNTER CLOSING DAY OF DEVICE ADDRESS 1 |
| 17 | COUNTER CLOSING DAY OF DEVICE ADDRESS 2 |
| 18 | COUNTER CLOSING DAY OF DEVICE ADDRESS 3 |
| 19 | COUNTER CLOSING DAY OF DEVICE ADDRESS 4 |
| 20 | ALARM CALL REPORTING TIME |
| 21 | BLOCK BILLING CALL REPORTING TIME |
| 22 | COUNTER CALL REPORTING TIME |

FIG.13

MANAGEMENT DATA OF DB IN CENTRAL MANAGEMENT APPARATUS

| CUSTOMER ID | PPCID | COUNTER INFORMATION OF PREVIOUS TIME | | COUNTER INFORMATION OF THIS TIME | |
|---|---|---|---|---|---|
| | | DATE AND TIME OF RECEIPT | COUNTER VALUE | DATE AND TIME OF RECEIPT | COUNTER VALUE |
| 03-3778-7705 | 3210-110012 | 010325 22:03 | 00123456 | 0100425 22:03 | 00125678 |
| 03-3210-9876 | 3310-110123 | 010325 22:04 | 00654321 | 0100425 22:04 | 00654654 |
| ... | ... | ... | ... | ... | ... |
| ... | ... | ... | ... | ... | ... |

DATA COMMUNICATION APPARATUS, IMAGE FORMING APPARATUS MANAGEMENT SYSTEM USING THE DATA COMMUNICATION APPARATUS AND COUNTER INFORMATION TRANSMISSION METHOD THEREFOR

BACKGROUND OF THE INVENTION

1. Field of the Invention

The present invention relates to a data communication apparatus, an image forming apparatus management system using the data communication apparatus and a counter information transmission method therefor.

2. Description of the Related Art

As an image forming apparatus management system, a system is generally known in which image forming apparatuses such as plain paper copying machines installed in unspecified number of customers (users) and provided with remote diagnosis can connect with a central management apparatus installed in a service center (base of sales and service) or the like using a data communication apparatus (communication adapter) and a communication line such as a public circuit, and the image forming apparatuses are remotely controlled by the central management apparatus through the communication line and the data communication apparatus.

In such an image forming apparatus management system, the image forming apparatus counts (accumulates) the number of formed images according to image forming operations and is equipped with a counter that stores counter information representing the counted value.

The data communication apparatus has a connecting means that can connect a plurality of image forming apparatuses. The data communication apparatus regularly (once a day at a predetermined time, which is previously set, for example) obtains the counter information representing the value of the counter from the image forming apparatuses connected by the connecting means. Further, the data communication apparatus regularly (once a month on a predetermined closing day, which is previously set, for example) transmits maintenance contract management data to the central management apparatus through the communication lines. The maintenance contract management data include the obtained counter information and model number information of the image forming apparatus from which the counter information is obtained. The transmission is performed at intervals longer than the interval for obtaining the counter information.

In the above-mentioned data communication apparatuses, when the counter information is regularly obtained from the image forming apparatus (corresponding image forming apparatus) connected by the connecting means, actually, the obtained counter information is always provided as newest counter information (the counter information is updated by overwriting the counter information obtained at the last time). For this reason, when abnormality occurs, for example, a counter value becomes "0" or is garbled due to noise or the like in the corresponding image forming apparatus, the data communication apparatus obtains the counter information representing an abnormal counter value, stores the counter information thereof as the newest counter information, and transmits the counter information, as the maintenance contract management data, to the central management apparatus.

When such maintenance contract management data are received, the central management apparatus performs an accounting process based on the maintenance contract management data. However, an appropriate accounting process cannot be performed. Thus, it is impossible to charge a correct maintenance contract fee to a customer of the corresponding image forming apparatus.

SUMMARY OF THE INVENTION

It is a general object of the present invention to provide an improved and useful data communication apparatus, image forming apparatus management system using the data communication apparatus, and counter information transmission method therefor, in which the above-mentioned problems are eliminated.

A more specific object of the present invention is to provide a data communication apparatus, image forming apparatus management system using the data communication apparatus, and counter information transmission method therefore, in which it is always possible for a central management apparatus to charge a customer of an image forming apparatus with the correct maintenance contract fee even in a case where abnormality occurs in the counter of the image forming apparatus.

The object described above is achieved, according to one aspect of the present invention, by a data communication apparatus that has a connecting means that can connect a plurality of image forming apparatuses, each having a counter for counting the number of formed images, regularly obtains counter information representing values of the counters from the image forming apparatuses connected by said means, and regularly transmits, at longer intervals than an interval of obtaining the counter information, the obtained counter information with model number information of the image forming apparatuses from which the counter information is obtained as maintenance contract management data to a central management apparatus that remotely controls the image forming apparatuses through a communication line such as a public circuit, comprising: model number information setting means for setting the model number information of the image forming apparatuses connected by the connecting means according to a requirement from the central management apparatus; counter information obtaining means for regularly obtaining the counter information representing the value of the counter from the image forming apparatuses by the connecting means; a first memory and a second memory storing the counter information obtained by said means for each of the image forming apparatuses so as to correspond to the model number information that is previously set by the model number information setting means and matches the model number information of the image forming apparatuses from which the counter information is obtained; counter information writing control means for, when obtaining the counter information by the counter information obtaining means, prior to writing the counter information to the first memory, for the counter information of each of the image forming apparatuses obtained a previous time by the counter information obtaining means and already contained in the first memory, moving the counter information contained in the first memory so as to correspond to the model number information that matches the model number information of the image forming apparatuses from which the counter information is obtained this time to the second memory and writing the counter information to the second memory so as to correspond to the model number information thereof for each of the image forming apparatuses, and thereafter writing the counter information obtained this time by the counter information obtaining means to the first memory for each of the image forming apparatuses so as to correspond to the model number information that is previously set by the model number information setting means and matches the model number information of the image forming apparatuses from which the counter information is obtained this time; counter abnormality detecting means for comparing the counter information obtained this time by the counter information obtaining means with the counter information obtained the previous time, the model number of the counter information thereof matching the model number of the image forming apparatuses from which the counter information is obtained this time, and detecting the counter information as counter abnormality when there is a contradiction between the counter information obtained this time and the counter information obtained the previous time; and counter abnormality information transmitting means for, when the counter abnormality is detected by said counter abnormality detecting means, transmitting counter abnormality information to the central management apparatus with each of the counter information obtained this time and the counter information obtained the previous time obtained by the counter information obtaining means and the model number information of the image forming apparatuses from which the counter information is obtained this time.

The object described above is also achieved, according to another aspect of the present invention, by a counter information transmission method for a data communication apparatus that has a connecting means that can connect a plurality of image forming apparatuses, each having a counter for counting the number of formed images, regularly obtains counter information representing values of the counters from the image forming apparatuses connected by said means, and regularly transmits the obtained counter information with model number information of the image forming apparatuses from which the counter information is obtained to a central, management apparatus that remotely controls the image forming apparatuses through a communication line such as a public circuit, at longer intervals than an interval of obtaining the counter information, wherein, according to a requirement from the central management apparatus, the model number information of the image forming apparatuses connected by the connecting means is previously set, when the counter information representing the value of the counter is regularly obtained from the image forming apparatuses connected by the connecting means, prior to writing the counter information to a first memory, for the counter information for each of the image forming apparatuses obtained at a previous time and already contained in the first memory, the counter information contained in the first memory so as to correspond to the model number information that matches the model number information of the images forming apparatuses from which the counter information is obtained this time is moved to a second memory and is written for each of the image forming apparatuses so as to correspond to the model number information, thereafter, the counter information obtained this time is written to the first memory for each of the image forming apparatuses so as to correspond to the model number information that is previously set and matches the model number information of the image forming apparatuses from which the counter information is obtained this time, and at the same time, the counter information obtained this time is compared with the counter information obtained the previous time of which the model number information matches the model number information of the image forming apparatuses from which the counter information is obtained this time, the counter information is detected as a counter abnormality in a case where the counter value represented by the counter information obtained this time is smaller than the counter value represented by the counter information obtained the previous time or where the counter value represented by the counter information obtained this time includes a character other than numbers, and counter abnormality information is transmitted to the central management apparatus with the counter information obtained this time and the counter information obtained the previous time, the model number information of the image forming apparatuses from which the counter information is obtained this time, and information of date and time of obtaining said counter information.

The object described above is also achieved, according to another aspect of the present invention, by An image forming apparatus management system comprising an image forming apparatus including a counter for counting the number of formed images, a central management apparatus that remotely controls the image forming apparatus, and a data communication apparatus that has a connecting means that can connect a plurality of image forming apparatuses, regularly obtains the counter information representing the values of the counters from the image forming apparatuses connected by said means, and regularly transmits the obtained counter information with model number information of the image forming apparatuses from which the counter information is obtained as maintenance contract management data to the central management apparatus that remotely controls the image forming apparatuses through a communication line such as a public circuit at longer intervals than an interval of obtaining the counter information, wherein the central management apparatus comprises: means for storing a database for containing management data for remotely controlling the data communication apparatus including the model number information of the image forming apparatuses connected by the connecting means of the data communication apparatus; model number information setting requirement data transmitting means for transmitting model number information setting requirement data including the model number information of the image forming apparatuses connected by the connecting means of the image forming apparatuses and representing setting requirements of the model number information; maintenance contract management data writing means for, in a case when the maintenance contract management data are received from the data communication apparatus, for the counter information and model number information in the data thereof, writing the counter information for each of the image forming apparatuses to the database so as to correspond to the model number information that is contained in the database and matches the model number information in the maintenance contract management data; and counter abnormality information writing means for, in a case where counter abnormality information is received from the data communication apparatus, for the counter information obtained this time and the counter information obtained a previous time and model number information in the counter abnormality information, writing the counter information to the database so as to correspond to the model number information that is contained in the database and matches the model number in the counter abnormality information, and the data communication apparatus comprises: model number information setting means for setting the model number information of the image forming apparatuses connected by the connecting means according to a requirement from the central management apparatus; counter information obtaining means for regularly obtaining the counter information representing the value of the counter from the image forming apparatuses by the connecting means; a first memory and a second memory storing the counter information obtained by said connecting means for each of the image forming apparatuses so as to correspond to the model number information that is previously set by the model number information setting means and matches the model number information of the image forming apparatuses from which the counter information is obtained this time; counter information writing control means for, when obtaining the counter information from the counter information obtaining means, prior to writing the counter information to the first memory, for the counter information of each of the image forming apparatuses obtained the previous time by the counter information obtaining means and already contained in the first memory, moving the counter information contained so as to correspond to the model number information that matches the model number information of the image forming apparatuses from which the counter information is obtained this time to the second memory and writing the counter information to the second memory so as to correspond to the model number information thereof for each of the image forming apparatuses, and thereafter writing the counter information obtained this time by the counter information obtaining means to the first memory for each of the image forming apparatuses so as to correspond to the model number information that is previously set by the model number information setting means and matches the model number information of the image forming apparatuses from which the counter information is obtained this time; counter abnormality detecting means for comparing the counter information obtained this time by the counter information obtaining means with the counter information obtained the previous time, the model number of the counter information thereof matching the model number of the image forming apparatuses from which the counter information is obtained this time, and detecting the counter information as counter abnormality when there is contradiction between the counter information obtained this time and the counter information obtained the previous time; and counter abnormality information transmitting means for, when the counter abnormality is detected by said counter abnormality detecting means, transmitting the counter abnormality information to the central management apparatus with the counter information obtained this time and the previous time by the counter information obtaining means and the model number information of the image forming apparatuses from which the counter information is obtained this time.

Therefore, according to the present invention, the central management apparatus can always charge a customer of the image forming apparatus with the correct maintenance contract fee even in a case where abnormality occurs in the image forming apparatus. For this reason, it is possible to improve reliability of the image forming apparatus management system.

Other objects, features and advantages of the present invention will become more apparent from the following detailed description when read in conjunction with the following drawings.

BRIEF DESCRIPTION OF THE DRAWINGS

FIG. 5 is a table showing examples of various parameters which are previously contained in RAM 42 of FIG. 4;

FIG. 13 is a schematic diagram showing examples of management data contained in a database in the hard disk 105 of the apparatus body 103 of FIG. 12;

DETAILED DESCRIPTION OF THE PREFERRED EMBODIMENTS

Figure 1:
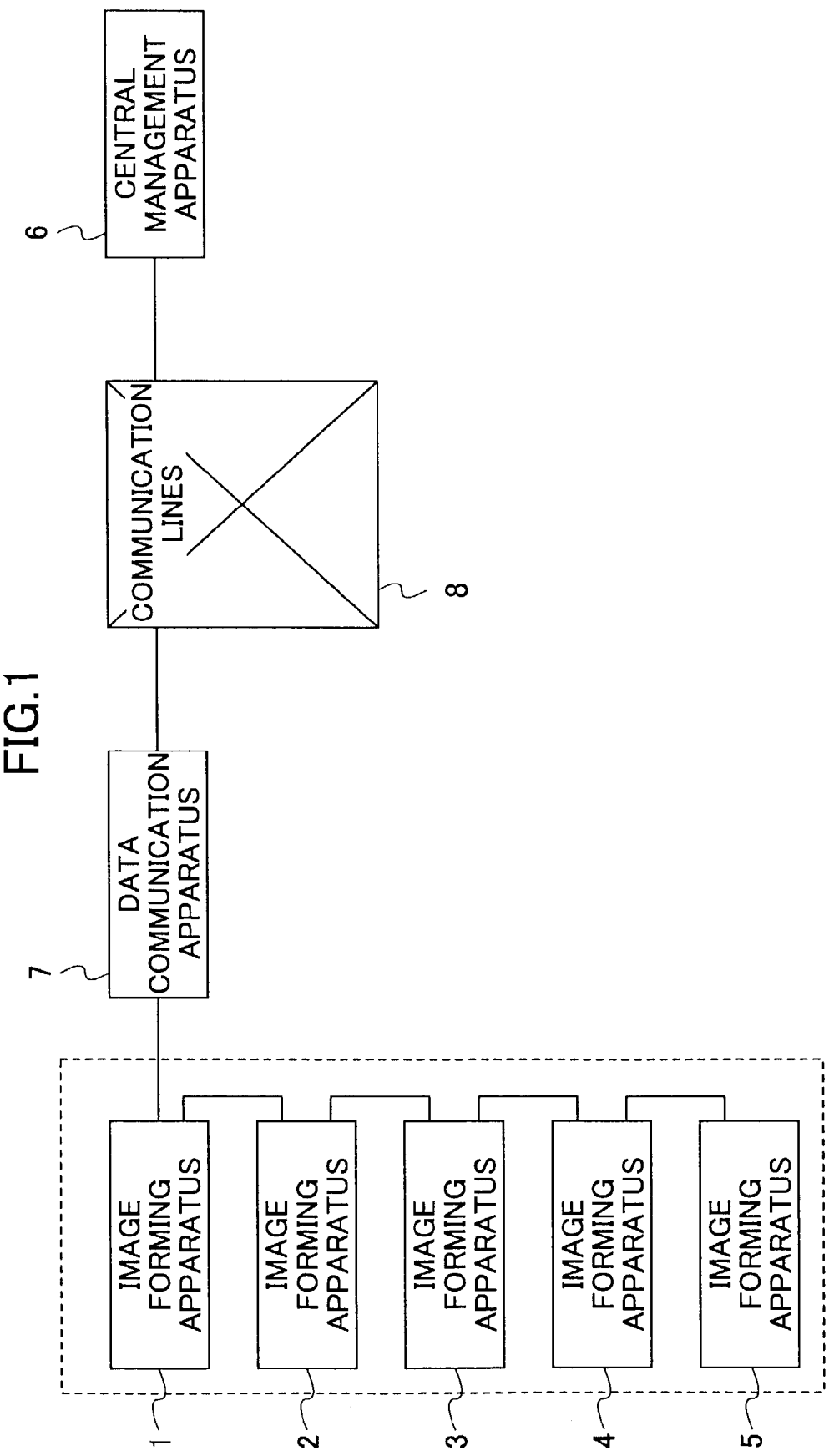
FIG. 1 is a block diagram showing an example of a structure of an image forming apparatus management system according to the present invention.

In the following, a specific description will be given of embodiments of the present invention, by referring to the drawings.

FIG. 1 is a block diagram showing an example of a structure of an image forming apparatus management system according to the present invention.

The image forming apparatus management system includes a plurality of image forming apparatuses (plain paper copying machines or the like) 1 through 5 assuming remote diagnosis, a data communication apparatus 7, and a central management apparatus 6. The central management apparatus 6 can centrally and remotely control each of the image forming apparatuses 1 through 5 via a communication line 8, such as a public circuit or dedicated line, and the data communication apparatus 7.

The data communication apparatus 7 has a connecting means which can connect a plurality of image forming apparatuses including each of the image forming apparatuses 1 through 5. The data communication apparatus 7 selectively transmits a command signal sent from the central management apparatus 6 via the communication line 8 to the image forming apparatuses 1 through 5. On the other hand, the data communication apparatus 7 transmits (reports) various report information sent from the image forming apparatuses 1 through 5 to the central management apparatus 6 via the communication line 8.

The data communication apparatus 7 is online 24 hours a day and can communicate with the central management apparatus 6 even in nighttime when power of the image forming apparatuses 1 through 5 is generally turned off. The data communication apparatus 7 and each of the image forming apparatuses 1 through 5 are connected by a multi-drop connection using a serial communication interface RS-485, for example. The data communication apparatus 7 communicates with each of the image forming apparatuses 1 through 5 by polling/selecting.

Figure 2:
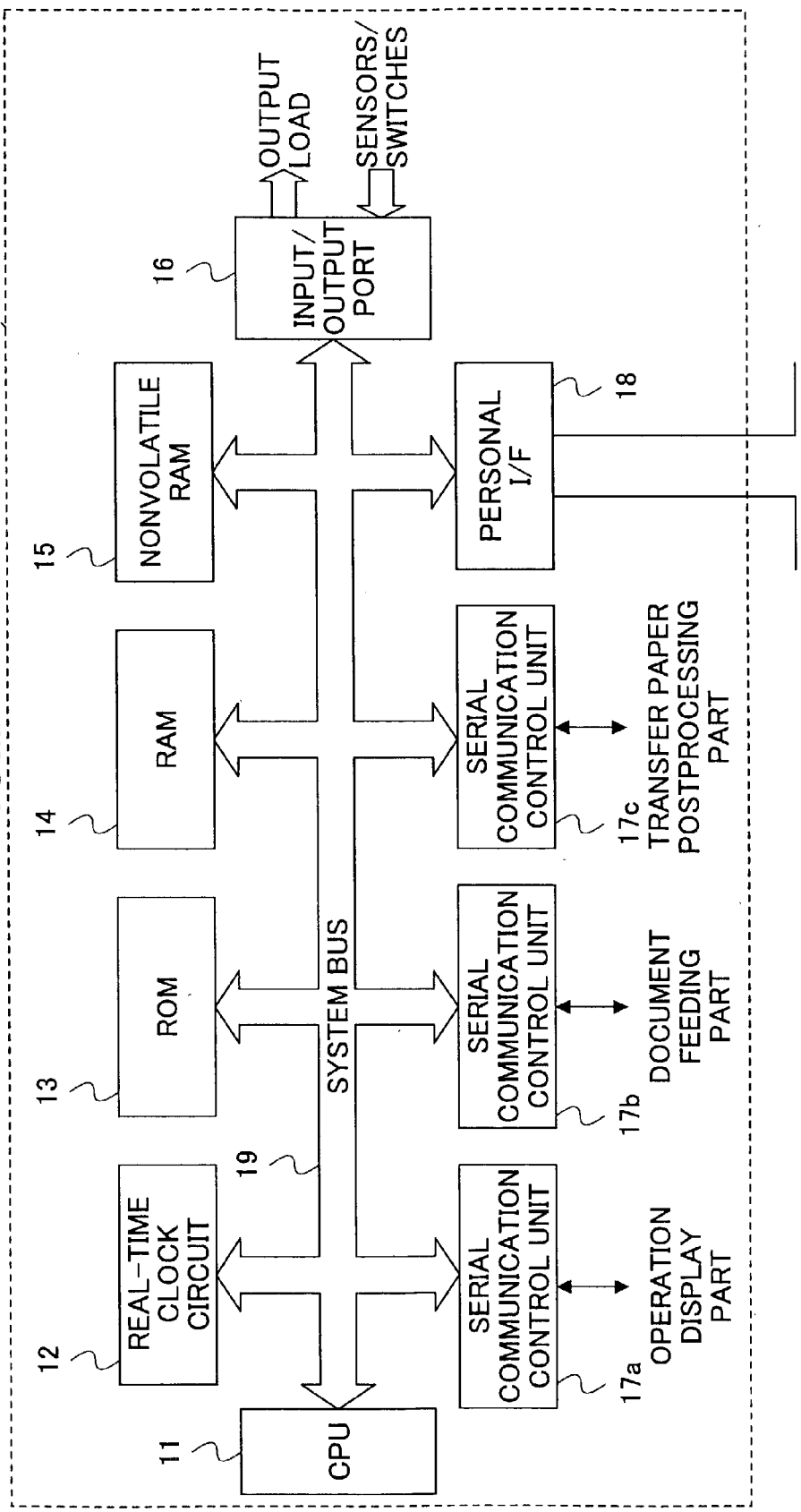
FIG. 2 is a block diagram showing an example of a structure of a control part of each of the image forming apparatuses 1 through 5 of FIG: 1.

FIG. 2 is a block diagram showing an example of a structure of the control part of each of the image forming apparatuses 1 through 5 of FIG. 1.

The control part of each of the image forming apparatuses 1 through 5 has a PPC controller, a personal interface 18 ("interface" is designated by "I/F", hereinafter) and a system bus 19. The PPC controller includes a CPU 11, a real-time clock circuit 12, a ROM 13, a RAM 14, a nonvolatile RAM 15, an input/output port 16, and serial communication control units 17a, 17b and 17c.

The CPU 11 is a central processing unit that totally controls the whole control part by control programs in the ROM 13.

The real-time clock circuit 12 generates time information. The CPU 11 reads the time information so as to obtain the present time.

The ROM 13 is a read-only memory that stores various fixed data including the control programs which the CPU 11 uses.

The RAM 14 is a memory for temporary storage used as a work memory or the like by the CPU 11 when the CPU 11 performs data processing.

The nonvolatile RAM 15 is a memory that stores contents of mode directions from an operation display part (not shown) or the like. The nonvolatile RAM 15 maintains stored contents even when the power of the information processing apparatus is turned off.

The nonvolatile RAM 15 counts (accumulates) the number of formed images according to an image forming operation by a direction from the CPU 11. In addition, the nonvolatile RAM 15 is also used as a counter for storing counter information representing values of counters. Further, other nonvolatile memory, such as a flash memory, may be used instead of the nonvolatile RAM 15

The input/output port 16 connects with loads, such as a motor, solenoid and clutch in the image forming apparatuses, receiving inputs from sensors/switches and providing output to control the loads.

The serial communication control unit 17a exchanges signals with the operation display part.

The serial communication control unit 17b exchanges signals with a document feeding part (not shown).

The serial communication control unit 17c exchanges signals with a transfer paper post processing part (not shown).

The personal I/F 18 is an interface circuit managing communication with the data communication apparatus 7 and is provided for downloading the load of communication processes of the CPU 11 with the data communication apparatus 7. Of course, the CPU 11 may include functions of the personal I/F 18 when the CPU 11 has sufficient processing capacity.

The main functions of the personal I/F 18 are:

(1) supervising the polling/selecting from the data communication apparatus 7

(2) processing of acknowledgement and negative acknowledgement to the data communication apparatus 7

(3) checking the validity of transmission/reception data, parity checks and resending required processes when an error occurs between one of the image forming apparatuses 1 through 5 and the data communication apparatus 7

(4) header processes of the transmission/reception data between each of the image forming apparatuses 1 through 5 and the data communication apparatus 7.

The system bus 19 is a bus line including an address bus, a control bus and a data bus. The system bus 19 mutually connects the CPU 11, the real-time clock circuit 12, the ROM 13, the RAM 14, the nonvolatile RAM 15, the input/output port 16, the serial communication control units 17a, 17b and 17c, and the personal I/F 18.

Figure 3:
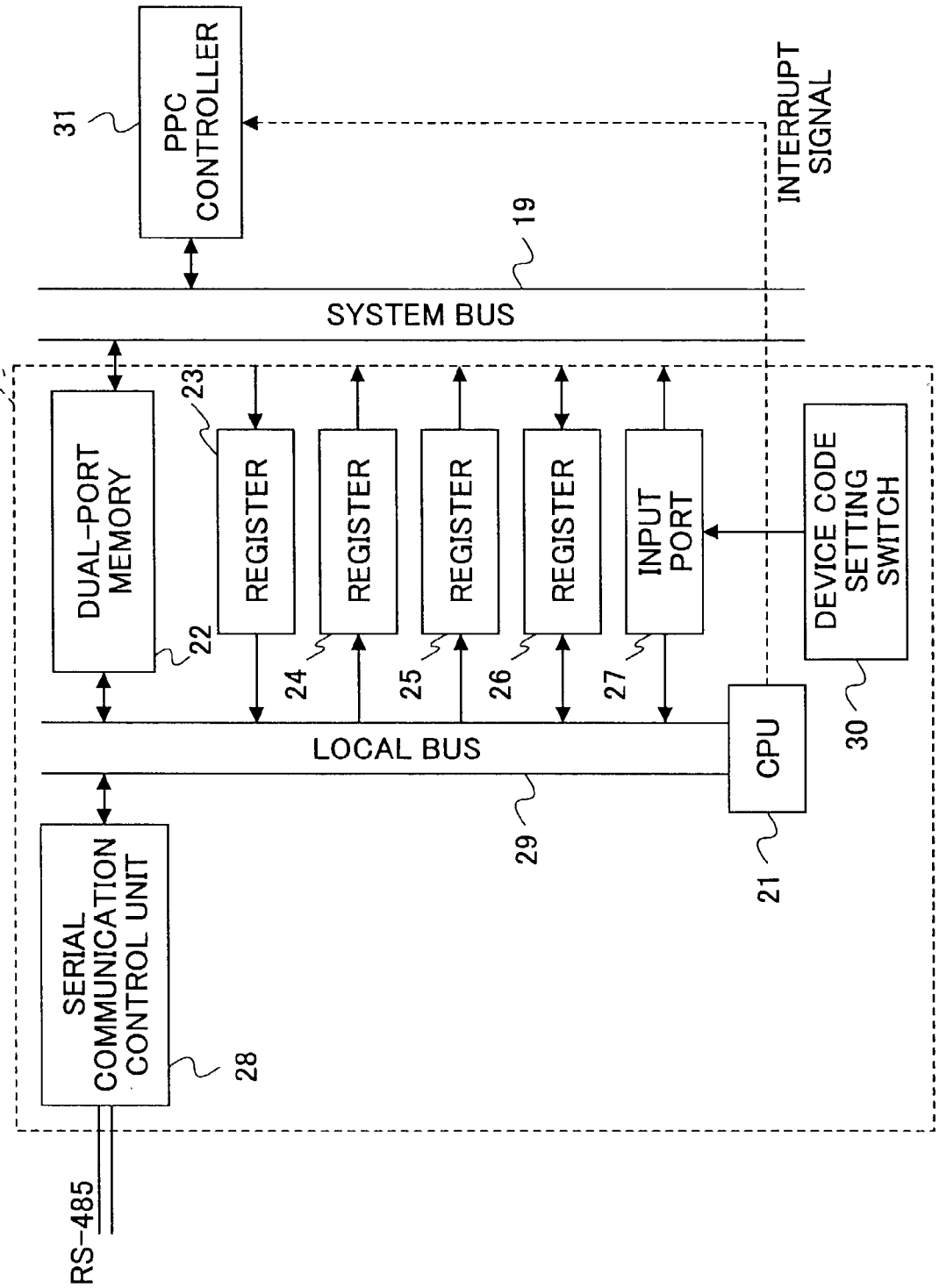
FIG. 3 is a block diagram showing an example of a structure of a personal I/F 18 of FIG. 2.

FIG. 3 is a block diagram showing an example of the structure of the personal I/F 18 of FIG. 2.

The personal I/F 18 includes a CPU 21, a dual port memory 22, registers 23 through 26, an input port 27, a serial communication control unit 28, a local bus 29, and a device code setting switch 30.

The CPU 21 is a one-chip microprocessor including a central processing unit, for example, a ROM, a RAM, a bus connecting these parts, and the like. The CPU 21 totally controls the whole personal I/F 18.

The dual-port memory 22 can be read and written by both CPU 21 and CPU 11 of FIG. 2. The dual-port memory 22 is a data memory used for sending/receiving text data between the personal I/F 18 and a PPC controller 31.

Further, the PPC controller 31 includes the CPU 11, the real-time clock circuit 12, the ROM 13, the RAM 14, the nonvolatile RAM 15, the input/output port 16, and the serial communication control units 17a, 17b and 17c which are mentioned above.

The registers 23 through 26 are used for controlling in sending/receiving text data (a detailed description thereof will be omitted).

The device code setting switch 30 is for setting a specific device code (device address) for each of the image forming apparatuses. The device code setting switch 30 is used for identifying the device codes in polling/selecting from the data communication apparatus 7.

The serial communication control unit 28 is connected to the data communication apparatus 7 and/or a personal I/F 18 of other image forming apparatuses.

Figure 4:
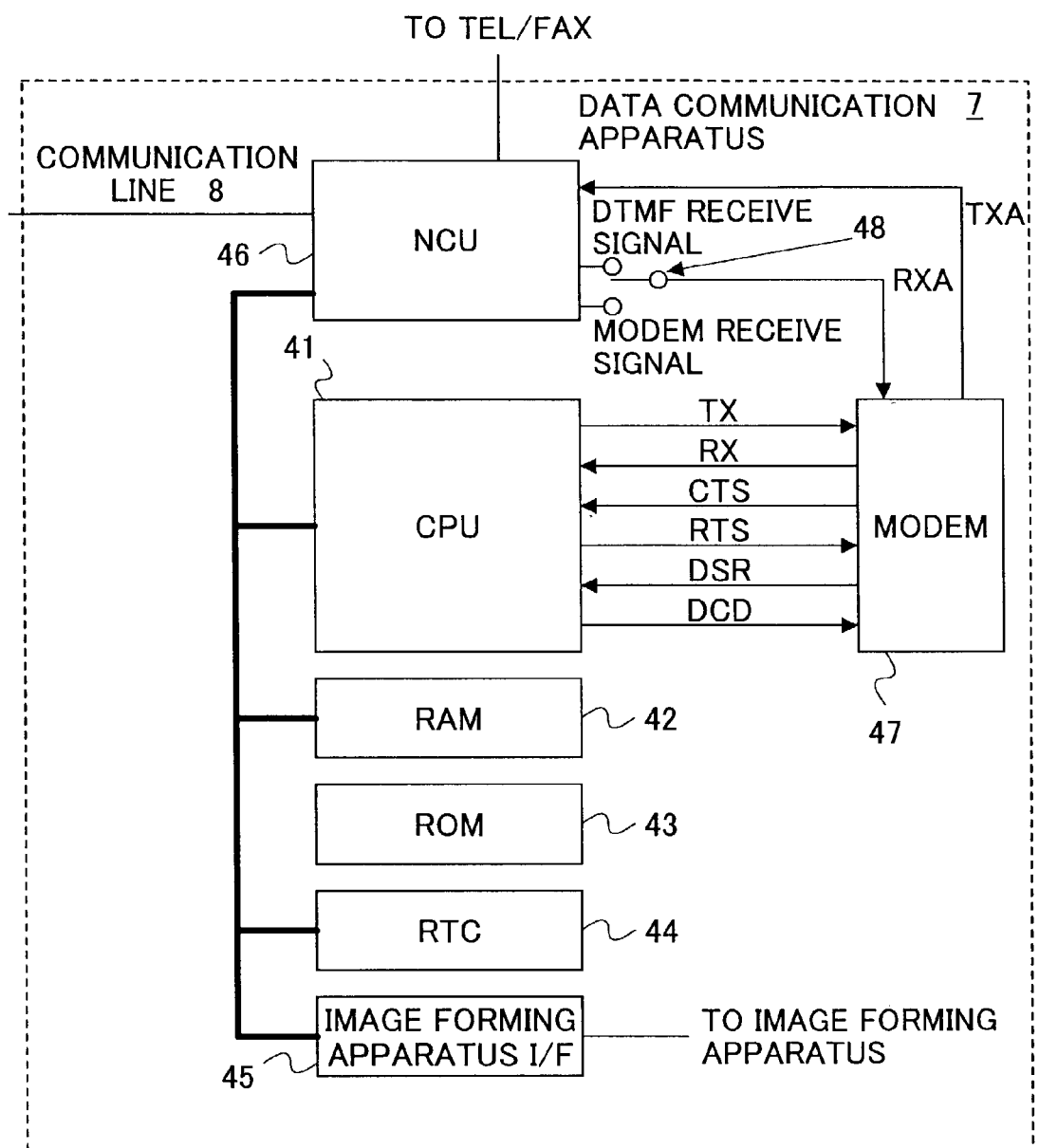
FIG. 4 is a block diagram showing an example of a structure of a data communication apparatus 7 of FIG. 1.

FIG. 4 is a block diagram showing an example of a structure of the data communication apparatus of FIG. 1.

The data communication apparatus 7 includes a CPU 41, a RAM 42, a ROM 43, a real-time clock circuit (RTC), 44, an image forming apparatus I/F 45, a NCU (net control unit) 46, a modem 47, and an analog switch 48.

The CPU 41 performs following control according to control programs in the ROM 43. In other words, the CPU 41 is a central processing unit that totally controls the whole data communication apparatus 7 by controlling the plurality of image forming apparatuses 1 through 5, controlling transmission/reception of the command signals to the central management apparatus 6 via the communication line 8 by the NCU 46, making calls to the central management apparatus 6 via the communication line 8 according to various reports from the image forming apparatuses 1 through 5, and performing switching control (including control of switching timing of the line) of connecting the communication line 8 to either the image forming apparatuses 1 through 5, or a telephone (TEL) or facsimile machine (FAX).

The CPU 41 operates according to programs in the ROM 43. When operating, the CPU 41 uses the real-time clock circuit 44, the image forming apparatus I/F 45, the NCU 46 and the modem 47 in accordance with the need so as to function as a model number information setting means, a counter information obtaining means, a counter information writing control means, a counter abnormality detecting means, a counter abnormality information transmitting means, a counter information obtaining time setting means, a counter information clearing means, a counter information setting means, and a counter abnormality information transmission prohibiting means.

The RAM 42 is a memory that stores various parameters, such as work memory used when the CPU 41 performs data processing, transmission data (counter information and the like) between the central management apparatus 6 and the plurality of the image forming apparatuses 1 through 5, each of the device codes (device addresses) and ID codes (making up a telephone number of the data communication apparatus 7 and the model numbers of the image forming apparatuses) that specify a single image forming apparatus from the plurality of the image forming apparatuses 1 through 5, a telephone number of the central management apparatus 6, the number of times of repeated calls (the number of times of redialing) when circuit connection does not succeed, an interval of repeating calls (waiting time for redialing), and the like. The RAM 42 maintains these stored contents even when power is turned off.

The RAM 42 is used as counter memories A, B and C, which will be described later. Each of the counter memories A, B and C stores counter information for each of the image forming apparatuses 1 through 5 such that the counter information corresponds to the model number information that is previously set and matches the model number information of the image forming apparatuses from which the counter information is obtained. The counter information is regularly obtained from each of the image forming apparatuses 1 through 5. The counter memories A and B correspond to first and second memories, respectively.

FIG. 5 shows examples of various parameters which are previously stored in (set to) the RAM 42 of the data communication apparatus 7.

The various parameters correspond to a case where the image forming apparatuses 1 through 5 are plain paper copying machines (PPC).

Each of a telephone number for a serviceman call (SC)/manual call (MC), a telephone number for an alarm call and a telephone number for block billing corresponds to the telephone number of the central management apparatus 6.

A PPC model number of device address (device code) 0 corresponds to the model number information of the image forming apparatus 1, a PPC model number of device address 1 corresponds to the model number information of the image forming apparatus 2, a PPC model number of device address 2 corresponds to the model number information of the image forming apparatus 3, a PPC model number of device address 3 corresponds to the model number information of the image forming apparatus 4, and a PPC model number of device address 4 corresponds to the model number information of the image forming apparatus 5.

A counter closing day of the device address 0 corresponds to a day on which counter information contained in an area for the image forming apparatus 1 of the counter memory B (which will be described later) is copied to an area for the image forming apparatus 1 of the counter memory C.

A counter closing day of the device address 1 corresponds to a day on which counter information contained in an area for the image forming apparatus 2 of the counter memory B is copied to an area for the image forming apparatus 2 of the counter memory C.

A counter closing day of the device address 2 corresponds to a day on which counter information contained in an area for the image forming apparatus 3 of the counter memory B is copied to an area for the image forming apparatus 3 of the counter memory C.

A counter closing day of the device address 3 corresponds to a day on which counter information contained in an area for the image forming apparatus 4 of the counter memory B is copied to an area for the image forming apparatus 4 of the counter memory C.

A counter closing day of the device address 4 corresponds to a day on which counter information contained in an area for the image forming apparatus 5 of the counter memory B is copied to an area for the image forming apparatus 5 of the counter memory C.

Counter call reporting time corresponds to a time when the counter information contained in the counter memory C is reported to the central management apparatus 6 as counter call information (maintenance contract management data).

Further, the RAM 42 stores counter information obtaining time (counter information obtaining period) at which the counter information is obtained, though not shown in FIG. 5.

Additionally, the counter information obtaining time and counter call reporting time are set such that obtained counter information is regularly transmitted to the central management apparatus 6, as counter call information, at intervals longer than the intervals for obtaining the counter information.

The ROM 43 is a read-only memory storing various fixed data including the control programs used by the CPU 41.

The real-time clock circuit 44 generates time information. The CPU 41 reads the time information so as to obtain the present time.

The image forming apparatus I/F 45 is a connecting means that can connect each of the image forming apparatuses 1 through 5 that are remote control target (apparatuses o be controlled remotely).

When transmitting data to the central management apparatus 6, the modem 47 modulates the, data so that the data can be transmitted through the communication line 8. In addition, when receiving modulated data transmitted from the central management apparatus 6, the modem 47, demodulates the data.

The modem 47 and CPU 41 are connected by data lines of transmission data (TX) and receive data (RX), and signal lines of a clear to set signal (CTS), a request to send signal (RTS), a data set ready signal (DSR), and a carrier detect signal (DCD). The modem 47 is controlled according to the request to send signal (RTS) and carrier detection signal (DCD) from the CPU 41.

Additionally, the NCU 46 and modem 47 are connected by signal lines of receive data (RXA) and transmission data (TXA). The receive data (RXA) is an analog signal modulated by a modem of the central management apparatus 6. The transmission data (TXA) is an analog signal modulated by the modem 47.

The analog switch 48 switches a signal which is output to the modem 47 according to a control signal (direction) from the CPU 41.

Figure 6:
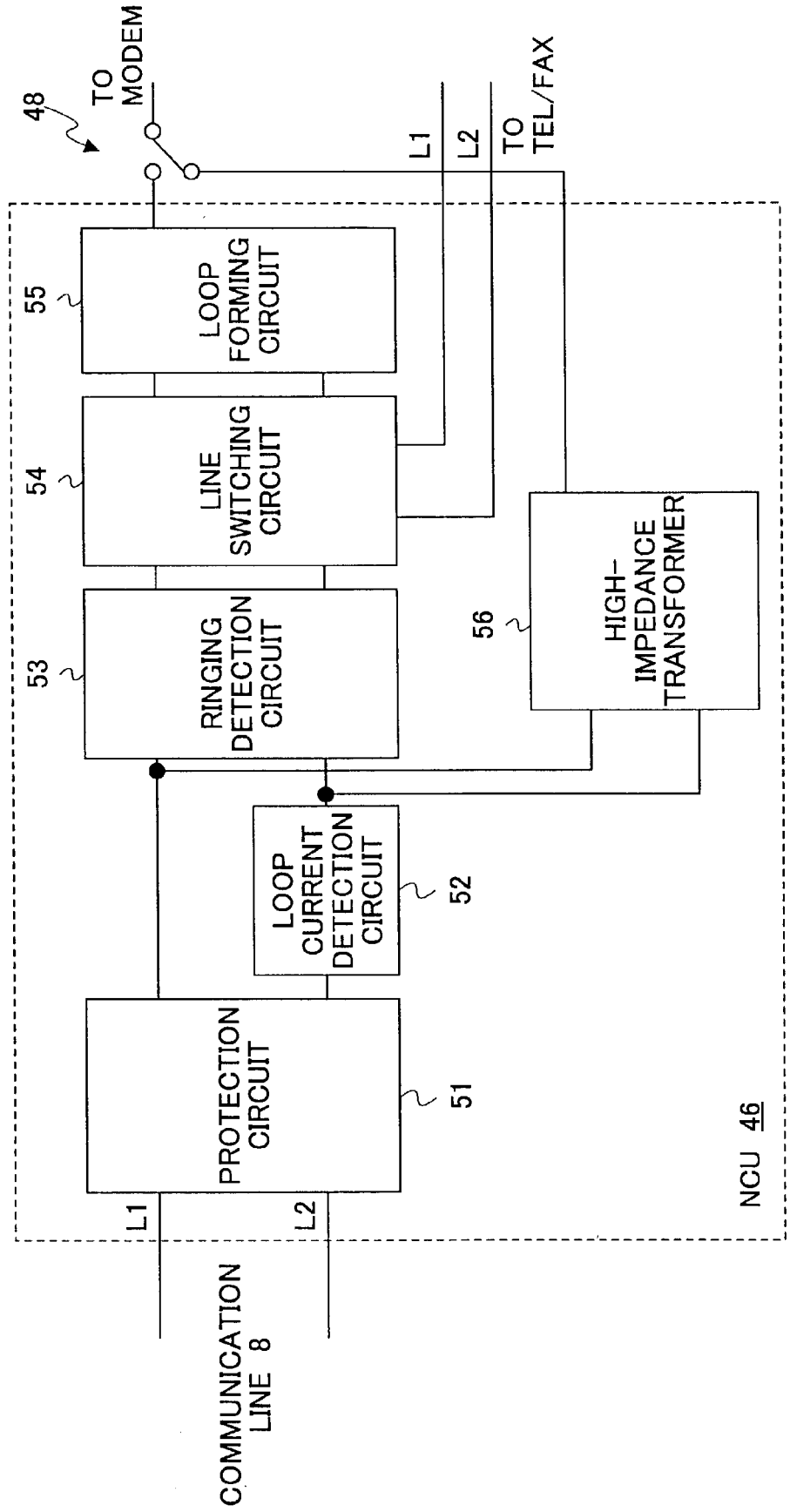
FIG. 6 is a block diagram showing an example of a structure of the NCU 46 of FIG. 4.

FIG. 6 is a block diagram showing an example of the structure of the NCU 46 of FIG. 4.

The NCU 46 includes a protection circuit 51, a loop current detection circuit 52, a ringing detection circuit 53, a line switching circuit 54, a loop forming circuit 55, a high-impedance transformer 56 and the like.

The protection circuit 51 is a circuit for protecting the data communication apparatus 7 from noise of the communication line 8.

The loop current detection circuit 52 detects current flowing through a direct current loop formed by the loop forming circuit 55. The loop current detection circuit 52 is formed by a bidirectional photo coupler (not shown) or the like.

The ringing detection circuit 53 detects a ring signal (ringing) from the communication line 8.

The line switching circuit 54 switches connection of the communication line 8 to either the modem 47 of the FIG. 4, or to an externally connected telephone (TEL) or facsimile machine (FAX).

The loop forming circuit 55 forms a direct current loop when catching a phone line by off-hooking, and transmits/receives a modem signal (voice grade signal) to/from the communication line 8.

The high-impedance transformer 56 extracts a DTMF signal such that a DTMF detection part (not shown) in the modem 47 can detect the DTMF signal transmitted from the central management apparatus 6.

A mode in which the loop forming circuit 55 forms the direct current loop and the modem 47 performs data communication (regular command mode) and a mode in which the DTMF detection part in the modem 47 detects the DTMF signal (DTMF detection mode that is a communication identification mode) can be selected by switching an output signal to the modem 47 via the analog switch 48.

Next, a description will be given of general functions of the image forming apparatus management system.

The functions of the image forming apparatus management system can be broadly divided into functions (1) through (3) as follows:

(1) communication control from the central management apparatus 6 to the image forming apparatuses 1 through 5

(2) communication control from the image forming apparatuses 1 through 5 to the central management apparatus 6 or to the data communication apparatus 7

(3) control of the data communication apparatus 7

The communication control (1) includes the following (a) through (c), for example.

(a) reading and resetting the counter information such as the total number of formed images (accumulated number of the formed images), the number of formed images of each paper feed stage (paper feed tray), the number of formed images of each size of transfer paper, the number of times of misfeeding, the number of times of misfeeding of each size of transfer paper, and the number of times of misfeeding of each carrying position of the transfer paper of a specific image forming apparatus (b) setting and reading adjusting values such as control power voltage, current, resistance, timing and the like of each unit structuring the image forming apparatus (c) returning a result (text) of the communication control (2).

This control is performed such that the data communication apparatus 7 receives the command signal from the central management apparatus 6 and performs the selecting of the image forming apparatuses 1 through 5. The selecting refers to a function of choosing and communicating with one of the five image forming apparatuses 1 through 5.

Figure 7:
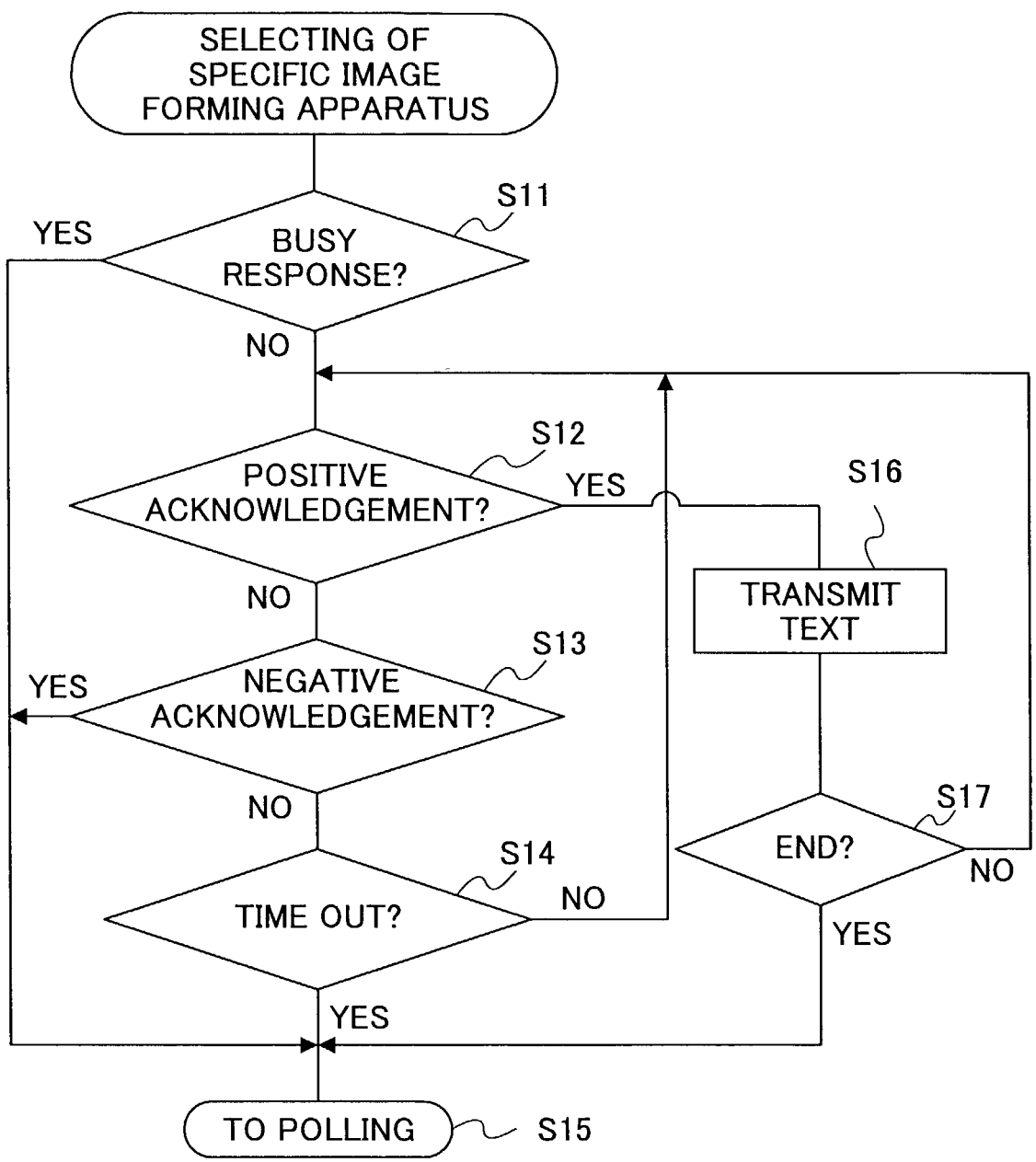
FIG. 7 is a flow chart for explaining an example of a selecting operation of the data communication apparatus 7 of FIG. 4.

FIG. 7 is a flow chart for explaining an example of a selecting operation of the data communication apparatus 7.

Each of the image forming apparatuses 1 through 5 has the unique (specific) device code. The data communication apparatus 7 transmits a selecting signal (SA signal), which is a specific code (or, a combination of codes) representing a predetermined selecting function, and the device code of the image forming apparatus to be chosen to each of the serial communication control units 28 of the personal I/Fs 18 via the RS-485 connections.

Each of the image forming apparatuses 1 through 5 compares the device code with own device code according to the selecting signal, and finds that the image forming apparatus itself is selected when both codes match.

In step S11, the image forming apparatus selected by the selecting outputs a busy response by a predetermined specific code (or a combination of codes) when having data to be transmitted (YES in step S11).

When the data communication apparatus 7 receives the busy response, the data communication apparatus 7 aborts the selecting operation and proceeds to a polling operation which will be described later (step S15).

In step S12, the image forming apparatus selected by the selecting determines whether or not it is possible to respond to the selecting when having no data to be transmitted. When it is possible, the image forming apparatus outputs a positive acknowledgement according to a predetermined specific code (or a combination of codes)(YES in step S12), and performs communication with the data communication apparatus 7 (step S16). When the communication ends (YES in step S17), the data communication apparatus 7 ends the selecting operation and proceeds to the polling operation.

When it is not possible (NO in step S12), in step S13, the image forming apparatus outputs a negative acknowledgement according to a predetermined specific code (or a combination of codes) (YES in step S13) and ends the communication with the data communication apparatus 7.

Additionally, in step S14, the data communication apparatus 7 ends the selecting operation after a predetermined time duration (YES in step S14) when it is impossible for the image forming apparatus responding to the device code that is output by the data communication apparatus 7 to output either the positive acknowledgement or negative acknowledgement for a reason such as, for example, that the power is turned off (NO in step S13).

The communication control (2) includes the following (a) through (e), for example.

(a) When abnormality (breakdown) occurs such that an image forming operation becomes impossible, each of the image forming apparatuses 1 through 5 with said abnormality immediately reports information representing the abnormality (emergency call information) to the central management apparatus 6 via the data communication apparatus 7 and communication line 8 (emergency report).

(b) When a user (customer) operates keys in the operation display so as to move from an image forming mode to a user requirement input mode for inputting a requirement (request for repair and request for supply replenishment) which the user asks, a user requirement input window is displayed on a character displaying part of the operation display part, and the user inputs the necessary requirement by pressing down predetermined keys on the window, each of the image forming apparatuses 1 through 5 receiving requirement information immediately reports requirement information (emergency call information) to the central management apparatus 6 via the data communication apparatus 7 and communication line 8 (emergency report).

(c) Each of the image forming apparatuses 1 through 5 immediately reports information (emergency call information) comprised of the accumulated number of formed images or order information of transfer paper to the central management apparatus 6 via the data communication apparatus 7 or communication line 8 every time the accumulated number of formed images reaches a predetermined number (contract number), which is previously set (emergency report).

(d) Each of the image forming apparatuses 1 through 5 reports information representing the accumulated number of formed images to the data communication apparatus 7 at regular periods, which are previously set. The data communication apparatus 7 reports the received information to the central management apparatus 6 via the communication line 8 in a mass at a predetermined time (set by the central management apparatus 6 and stored in the RAM 42 of the data communication apparatus 7) of the day (current day) (non-emergency report). This communication control includes control of transmitting the received information to the central management apparatus 6 without waiting for the predetermined time when the number of times of reporting of received information reaches a predetermined number.

(e) When an event occurs, such as the number of times of changing parts reaches a predetermined number of times, the predetermined time is coming, or a sensor reaches a standard level, which requires planned maintenance though it is possible to start the image forming operation, each of the image forming apparatuses 1 through 5 reports information representing the above-mentioned state to the data communication apparatus 7. The data communication apparatus 7 reports the received information to the central management apparatus 6 via the communication line 8 in a mass at the predetermined time (set by the central management apparatus 6 and stored in the RAM 42 of the data communication apparatus 7) of the day (non-emergency report). This communication control includes control of transmitting the received information without waiting for the predetermined time when the number of times of reporting of received information reaches a predetermined number of times before the predetermined time.

The above-mentioned communication control is performed by polling from the data communication apparatus 7. The polling refers to a function of communicating with each of the image forming apparatuses 1 through 5 in order, and of confirming existence of a communication requirement from each image forming apparatus.

Figure 8:
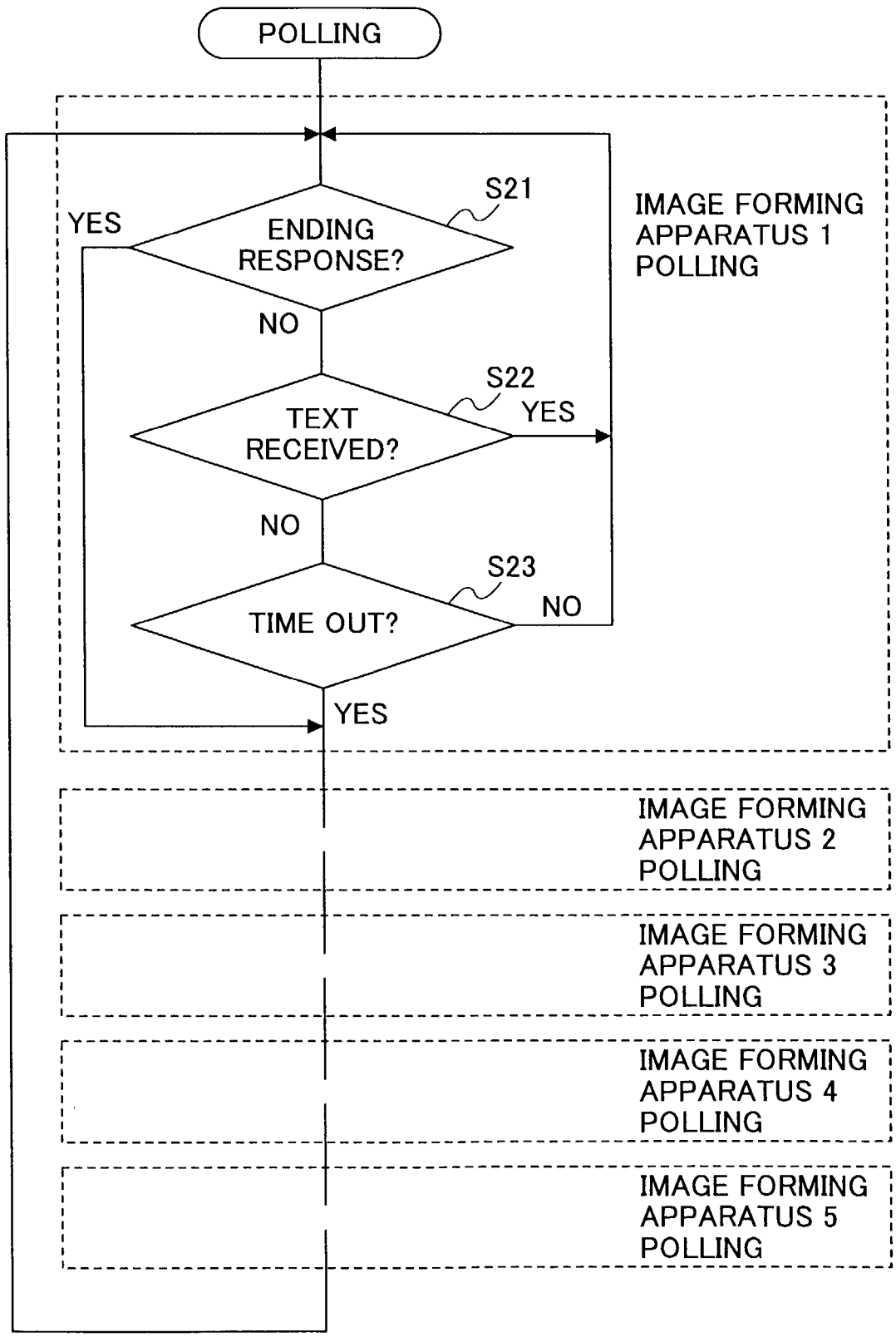
FIG. 8 is a flow chart for explaining an example of a polling operation of the data communication apparatus 7.

FIG. 8 is a flow chart for explaining an example of the polling operation of the data communication apparatus 7.

The data communication apparatus 7 transmits a polling signal (PA signal) which is the specific code (or a combination of codes) representing a predetermined polling function and the device code of the image forming apparatus to be chosen to the image forming apparatuses 1 through 5 via the serial communication I/F RS-485.

Each of the image forming apparatuses 1 through 5 compares the device code with the own device code according to the polling signal, and determines that the image forming apparatus itself is subjected to the polling when both codes match.

Next, the image forming apparatus subjected to the polling starts communication with the data communication apparatus 7 when the transmission data (a communication requirement to the data communication apparatus 7 or central management apparatus 6) exists. When a communication requirement does not exist, or when the started communication ends, the image forming apparatus subjected to the polling ends the communication with the data communication apparatus 7 by outputting an ending response according to a predetermined specific code (or a combination of codes).

In step S21, the data communication apparatus 7 moves to a polling of the next image forming apparatus when receiving an ending response (YES in step S21).

If NO in step S21, step S22 decides if text is received. If YES in step S22, process returns to step S21, but if NO in step S22, step S23 decides if predetermined duration time elapsed. Process returns to step S21 if NO in step S23.

Hence, when the image forming apparatus corresponding to the device code which is output by the data communication apparatus 7 cannot start the communication for a reason such as the power is turned off, or cannot output even the ending response the data communication apparatus 7 ends the polling operation after a predetermined duration of time.

The polling is repeated in order for each of the image forming apparatuses 1 through 5 that are connected until the selecting occurs.

The control (3) includes the following (a) and (b), for example.

(a) reading of a total counter value (b) returning of a result of communication from the image forming apparatuses 1 through 5 to the data communication apparatus 7 according to the communication control (2)

The control of reading (obtaining) of the total counter value (also referred to as "counter information", hereinafter) is performed by the selecting, for example, once a day at a fixed time (00:00, or, at the time when the power of the image forming apparatus is turned on for the first time after the fixed time when the power of the image forming apparatus has been turned off at the fixed time).

The data communication apparatus 7 has three memories (referred to as the counter memories A, B and C) in the RAM 42 for containing the counter information. The data communication apparatus 7 writes the counter information, which is read (obtained) by the selecting performed once a day at the fixed time, to the counter memory A. Accordingly, a value of the previous day in the counter memory A is overwritten every day (except a case where the power of the image forming apparatuses is not turned on all day, a holiday, for example.) When overwriting the counter information of the previous day, before the overwriting, the counter information contained in the counter memory A is moved and written (copied) to the counter memory B. In other words, the counter information previous to the newest counter information that the data communication apparatus 7 reads this time (the counter information which is read the previous time) from the image forming apparatuses 1 through 5 is written to the counter memory B.

Further, the counter information contained in the counter memory A is moved and written to the counter memory C once a month at a predetermined date and time (set by a requirement from the central management apparatus 6 and contained in the RAM 42 of the data communication apparatus 7 as a closing day).

The counter information transmitted (forwarded) from the data communication apparatus 7 to the central management apparatus 6 as the counter call information (also referred to as counter confirmation data) is the counter information contained in the counter memory C. In this case, as for transmission methods from the data communication apparatus 7 to the central management apparatus 6, there are two methods as shown by the following (a) and (b).

(a) The central management apparatus 6 reads the counter information contained in the counter memory C of the data communication apparatus 7 after the above-mentioned date and time (the date and time when contents of the counter memory A is copied to the counter memory C). That is, the central management apparatus 6 accesses (calls and transmits a corresponding read command) to the data communication apparatus 7 and obtains contents (the counter information of each of the image forming apparatuses 1 through 5) of the counter memory C transmitted from the data communication apparatus 7 as the counter call information.

(b) The data communication apparatus 7 calls and transmits the counter information contained in the counter memory C to the central management apparatus 6 via the communication line 8 as the counter call information at a counter call reporting time after the above-mentioned date and time. Further, the date and time of the counter call reporting performed by automatic calling are set by a requirement from the central management apparatus 6 and are contained in the RAM 42 of the data communication apparatus 7.

It should be noted that the data communication apparatus 7 has a plurality of memories, and each memory has a combination of the counter memories A, B, and C. This is because various total counter values, for example, counter values for black-and-white copy, application copy and color copy, are conceivable.

Figure 9:
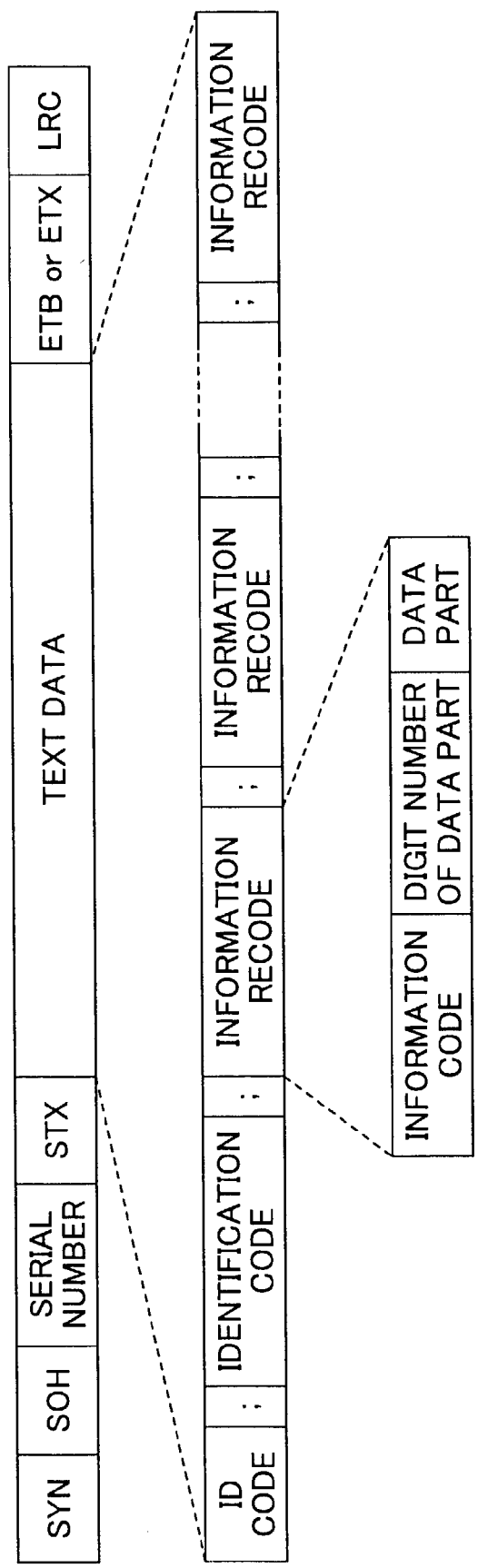
FIG. 9 is a schematic diagram showing an example of a structure of text data which is sent/received between the central management apparatus 6 and the data communication apparatus 7 of FIG. 1.

FIG. 9 is a schematic diagram showing an example of the structure of text data which is sent/received between the central management apparatus 6 and data communication apparatus 7.

In FIG. 9, a serial number is a communication block number in a single transmission. The first block has the serial number "01". The serial number increases one by one, and "00" comes after "99".

An ID code specifies the data communication apparatus 7 and one image forming apparatus out of the five image forming apparatuses 1 through 5 connected to the data communication apparatus 7.

The ID code includes a telephone number of the data communication apparatus 7 and the model number (model number information) of any of the image forming apparatuses 1 through 5.

An identification code includes a code (process code) representing a kind of an object of the communication, a transmitting source of the text data and a receiving destination. The process code is defined as shown in Table 1.

TABLE 1

| code | process name | process |
|---|---|---|
| 30 | SC call | automatic report when SC occurs |
| 31 | manual call | automatic report when manual switch is pressed |
| 32 | alarm transmission | automatic report when alarm occurs |
| 22 | block billing process | automatic report of reaching the block billing number |
| 02 | data reading | read internal data of PPC |
| 04 | data writing | overwrite internal data of PPC |
| 03 | execution | execute test by remote control |
| 08 | device code confirmation process | process for checking communication function |

An information record includes an information code, a digit number of data part and a data part, and each is defined as shown in Table 2.

A separator, semicolon (;), is inserted each between the ID code and identification code, the identification code and information record, and the information record and information record.

TABLE 2

| code | data length | description |
|---|---|---|
| information code | 11 | code representing a kind of specific information |
| digit number of data part | 2 | represent data length of following data part by ASCII code /set 00 when data part does not exist |
| data part | variable length | data of contents of each information code /this field does not exist when digit number of data part is 00 |

Figure 10:
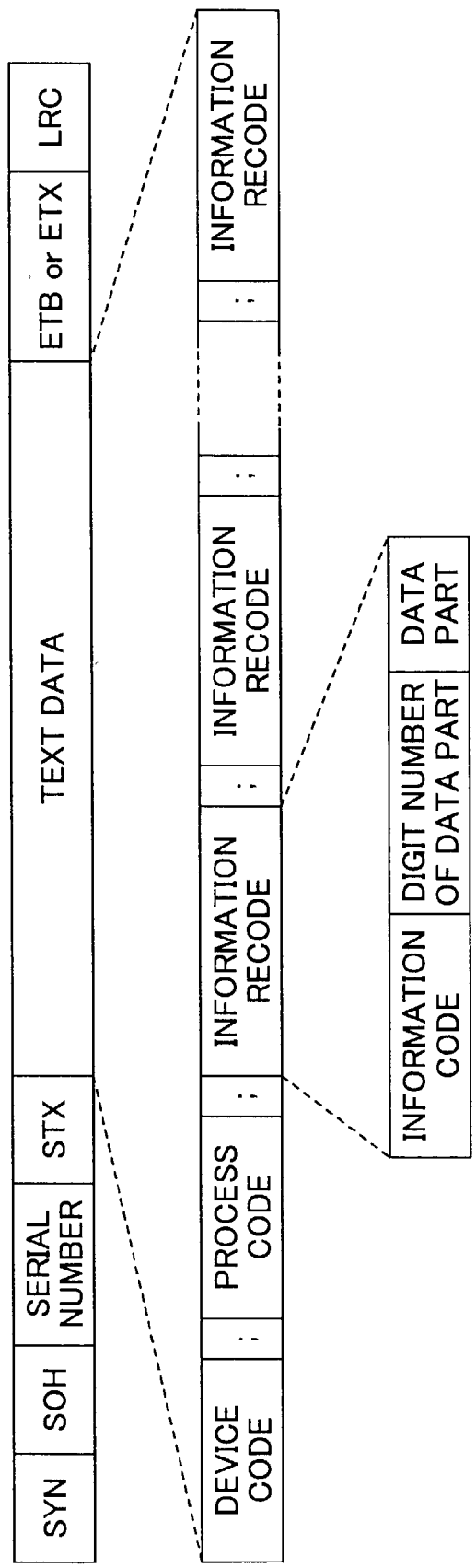
FIG. 10 is a schematic diagram showing an example of a structure of text data sent/received between the data communication apparatus 7 and a personal I/F of each of the image forming apparatuses 1 through 5 of FIG. 1.

FIG. 10 is a schematic diagram showing an example of the structure of text data given/received between the data communication apparatus 7 and the personal I/F 18 of each of the image forming apparatuses 1 through 5.

The device code is peculiarly set by the device code setting switch 30 (refer to FIG. 3) for each of the image forming apparatuses 1 through 5 as mentioned above. The relationship between the device code and ID code of FIG. 9 is stored in the RAM 42 of the data communication apparatus 7 by reading from the image forming apparatus upon installing, that is, when first connected to the data communication apparatus 7. The relationship is appropriately changed according to a direction in which the text data are transmitted thereafter.

As described above, the process code represents a kind of object of the communication. The process code corresponds to the identification code of FIG. 9 from which the transmitting source and receiving destination of the text data are eliminated. The transmitting source and receiving destination are also suitably added or deleted by the data communication apparatus 7 depending on a transmitting direction of the text data.

Figure 11:
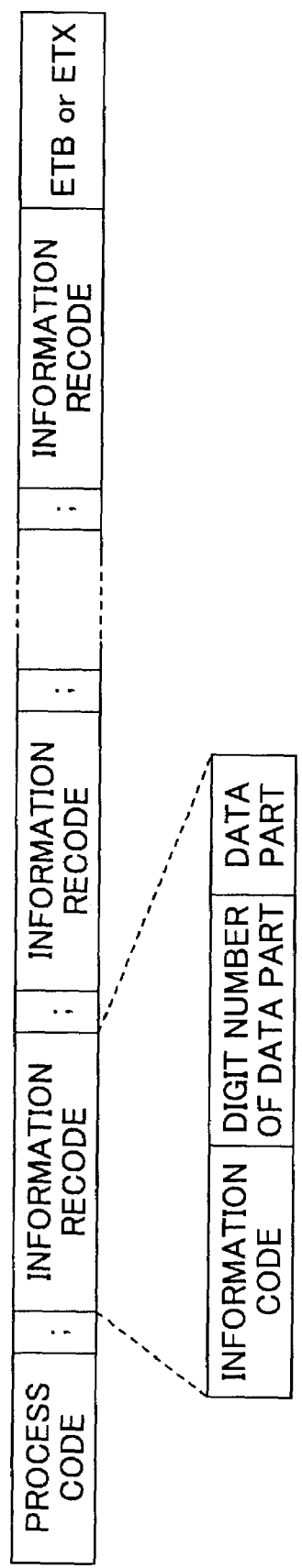
FIG. 11 is a schematic diagram showing an example of a structure of text data which is sent/received between the personal I/F of each of the image forming apparatuses 1 through 5 and a PPC controller.

FIG. 11 is a schematic diagram showing an example of the structure of text data which is sent/received between the personal I/F 18 of each of the image forming apparatuses 1 through 5 and the PPC controller 31 (refer to FIG. 3). The text data of FIG. 11 corresponds to the text data showed in FIG. 10, which is sent/received between the data communication apparatus 7 and personal I/F 18, from which a header, the device code, and a parity part are eliminated.

Figure 12:
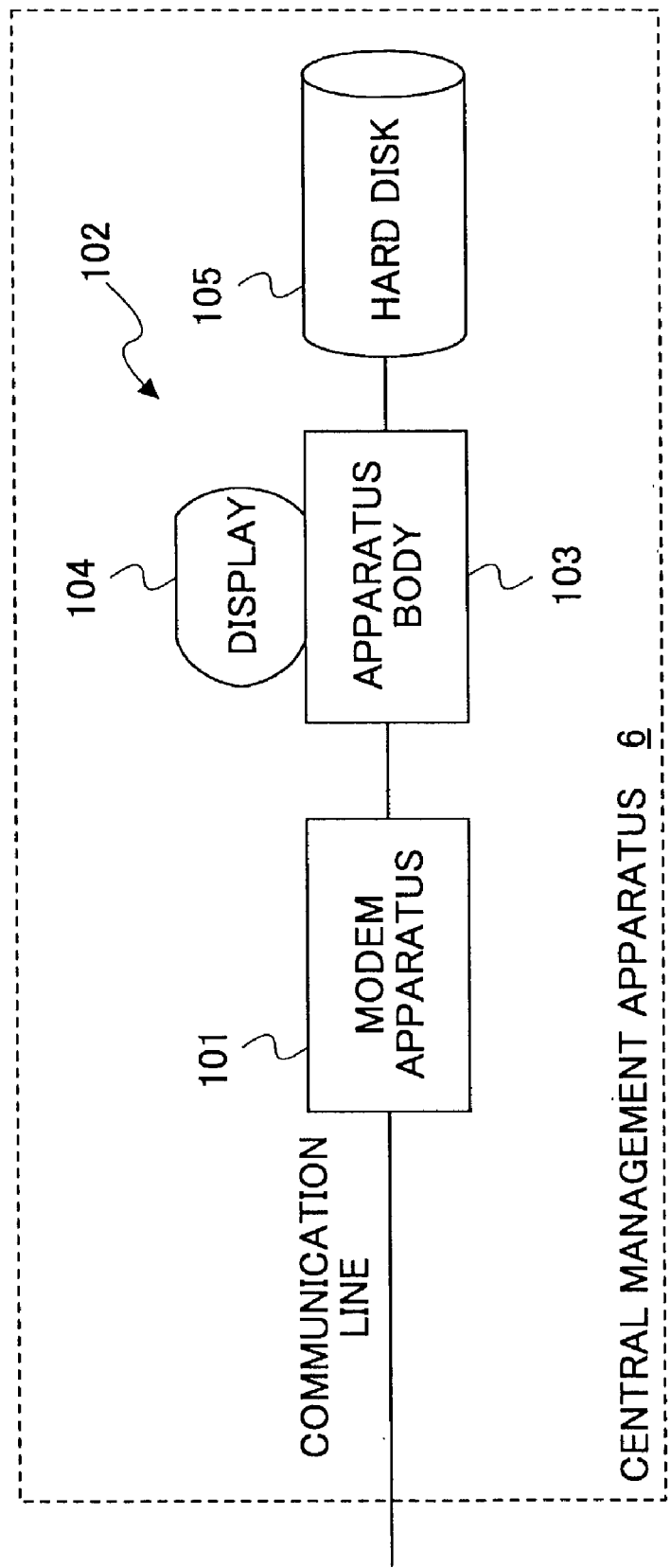
FIG. 12 is a block diagram showing an example of a general structure of the central management apparatus 6 of FIG. 1.

FIG. 12 is a block diagram showing an example of a general structure of the central management apparatus 6.

The central management apparatus 6 includes a modem apparatus 101 and a communication terminal apparatus 102.

The communication terminal apparatus 102 has an apparatus body 103 and a display 104.

The apparatus body 103 includes a ROM storing control programs, a CPU that performs various control according to the control programs, a control part using a micro computer including RAM that can read/write data and the like, and a hard disk 105.

The communication terminal apparatus 102 is connected to the modem apparatus 101 through a serial I/F such as RS232C. Additionally, the communication terminal apparatus 102 is connected to the data communication apparatus 7 through the modem apparatus 101 and communication line 8 so that the communication terminal apparatus 102 can perform data communication with the data communication apparatus 7.

The display 104 displays various data including data received from the data communication apparatus 7.

The hard disk 105 stores a database (DB) which contains customer IDs for identifying customers (telephone numbers of data communication apparatuses 7 of customers, for example), the model numbers (PPCID) of the image forming apparatuses 1 through 5 connected to the data communication apparatuses 7 of customers, management data for managing the image forming apparatuses 1 through 5 of the customers including data received from the data communication apparatus 7 and data communication apparatus 7.

FIG. 13 shows examples of management data contained in the database in the hard disk 105 of the apparatus body 103 of the central management apparatus 6.

The management data corresponds to a case where the image forming apparatuses 1 through 5 of customers are plain paper copying machines (PPC). In this example, as data received from the data communication apparatus 7, counter information that is obtained this time and previous time that is added to counter abnormality call information (counter abnormality information) by the data communication apparatus 7 is shown. The counter information includes the counter value and date and time of receipt (counter information obtaining date and time). However, the counter information may only include the counter value that matches the counter information with the date and time of receipt.

The CPU in the apparatus body 103 operates according to programs in the ROM. On that occasion, by using the modem apparatus 101 as occasion demands, the CPU performs functions as a model number information setting requirement data transmitting means, a maintenance contract management data writing means, a counter abnormality information writing means, a counter information obtaining time setting requirement data transmitting means, and a counter information setting requirement data transmitting means.

In the following, a description will be given of processes according to the present invention in the image forming apparatus management system of this embodiment, with reference to FIG. 14 and the following drawings.

Figure 14:
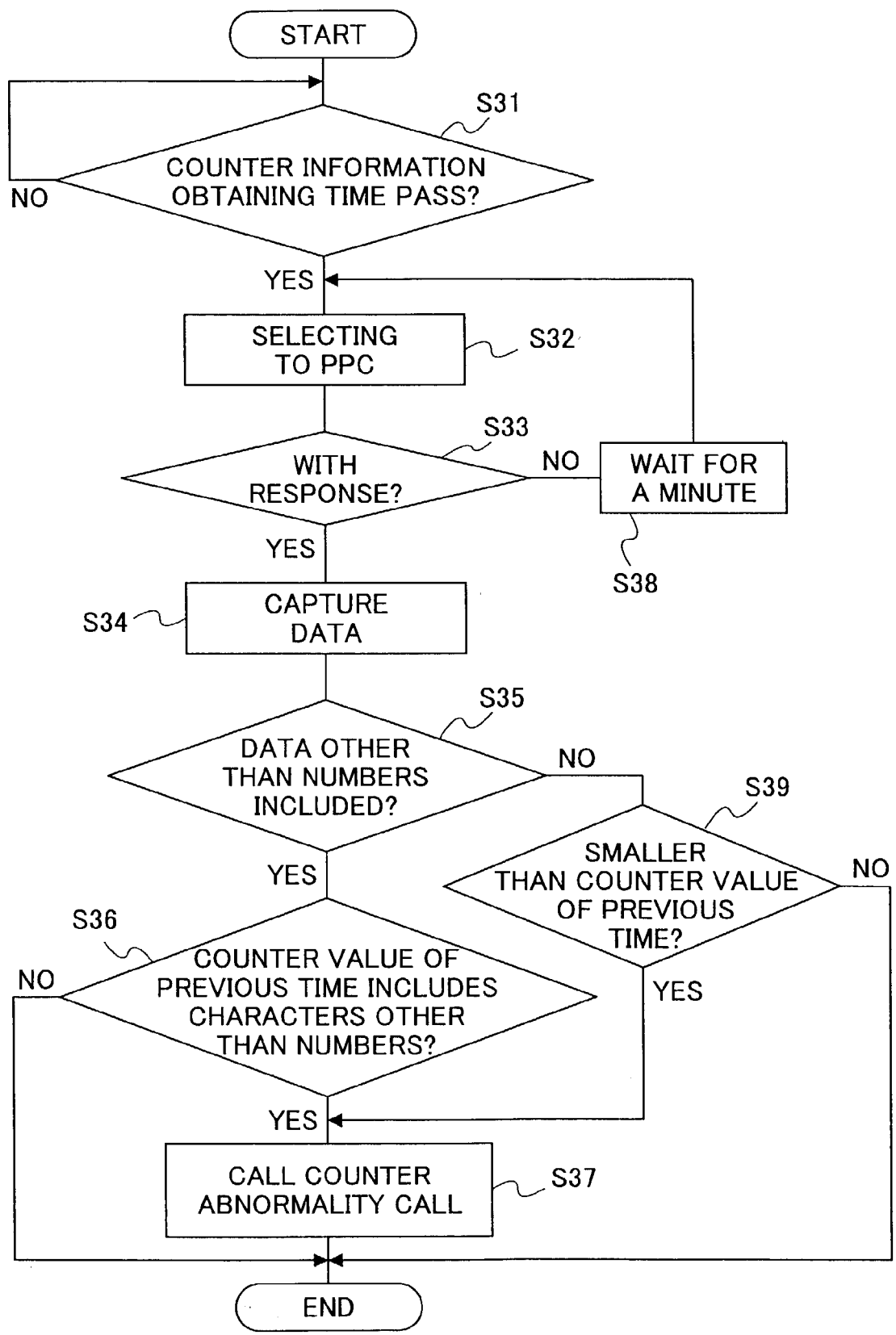
FIG. 14 is a flow chart for explaining an example of the counter information transmission process in the data communication apparatus 7 of FIG. 4.

FIG. 14 is a flow chart for explaining an example of the counter information transmission process at the data communication apparatus 7.

Figure 15:
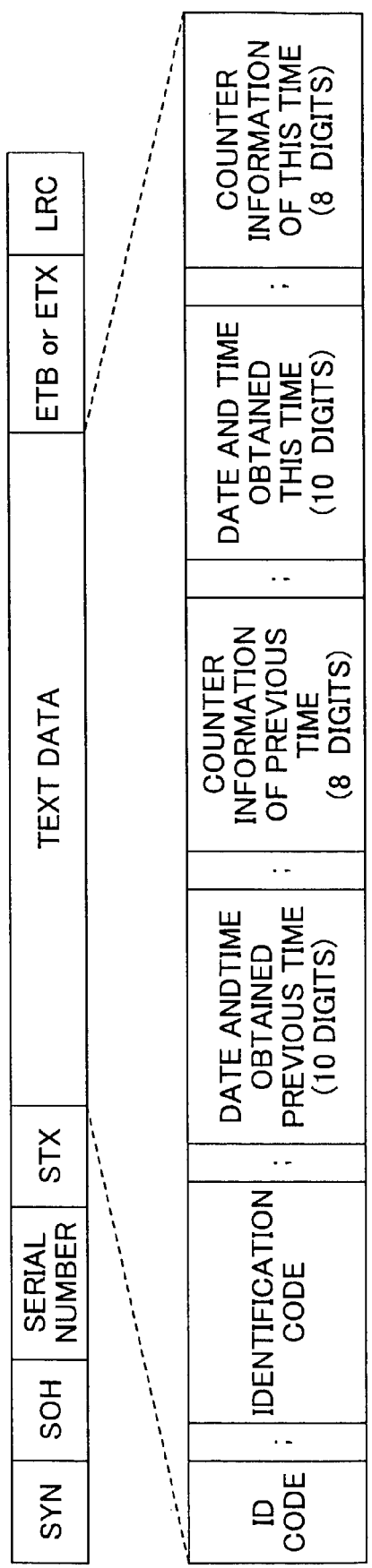
FIG. 15 is a schematic diagram showing an example of a format of counter abnormality call information transmitted from the data communication apparatus 7 to the central management apparatus 6 of FIG. 1.

FIG. 15 is a schematic diagram showing an example of a format of the counter abnormality information transmitted from the data communication apparatus 7 to the central management apparatus 6.

The central management apparatus 6 previously transmits model number information setting requirement data to the data communication apparatus 7. The model number information setting requirement data represents setting requirements of information including the model number information of the image forming apparatuses 1 through 5 connected to the data communication apparatus 7.

Additionally, the central management apparatus 6 transmits counter information obtaining time setting requirement data to the data communication apparatus 7. The counter information obtaining time setting requirement data represents setting requirements of time including the counter call reporting time at which the counter information contained in and obtained from each of the image forming apparatuses 1 through 5 connected to the data communication apparatus 7 is reported to the central management apparatus 6.

When the data communication apparatus 7 receives the model number information setting requirement data from the central management apparatus 6, the data communication apparatus 7 sets the model number information included in the data and stores the model number information in a parameter memory of the RAM 42. However, in a case where the model number information is changed by the setting, the counter information that corresponds to the model number information before the change and is contained in each of the counter memories A, B and C is cleared. This process is performed in a case where the image forming apparatus is replaced.

In addition, when the data communication apparatus 7 receives counter information obtaining time setting requirement data from the central management apparatus 6, the data communication apparatus 7 also sets and stores the counter information obtaining time (00:00, in this example) included in the data in the parameter memory of the RAM 42.

Further, when the data communication apparatus 7 receives counter call reporting time setting requirement data from the central management apparatus 6, the data communication apparatus 7 also sets and stores counter call reporting time included in the data in the parameter memory of the RAM 42.

On the other hand, as mentioned above, the control of obtaining the counter information (reading the total counter value) is performed by the selecting from the data communication apparatus 7 to the image forming apparatuses 1 through 5 once a day (step S32) at the predetermined time (step S31) (00:00, however, in a case where the power of the image forming apparatus is turned off at the counter information obtaining time, at the time when the power is turned on for the first time after the predetermined time (YES in step S31)).

For example, when the power of any of the image forming apparatuses 1 through 5 is turned off, a response corresponding to the selecting is not obtained (NO in step S33). In a case where the response is not obtained, the selecting is repeated at intervals of one minute (step S38). Thereby, it is possible to obtain the counter information when the power of the image forming apparatus, the power of which has been turned off, is turned on.

The data communication apparatus 7 has the counter memories A, B and C in the RAM 42. In step S34, the data communication apparatus 7 writes the counter information obtained by the above-mentioned selecting performed once a day at the predetermined time to the counter memory A (the first memory) with the information of date and time of reception such that the model number information of the image forming apparatuses 1 through 5 from which the counter information is obtained corresponds to the model number in the parameter memory.

Therefore, respective counter information of the respective image forming apparatuses of the counter memory A is overwritten every day (except in a case where the power of the image forming apparatuses is not turned on the whole day, holidays, for example).

When overwriting the counter information, for the counter information of respective image forming apparatuses obtained on the previous day (previous time) and already contained in the counter memory A, the counter information contained so as to correspond to the model number in the parameter memory and the model number thereof matches the respective model number information of the image forming apparatuses 1 through 5 from which the counter information is obtained this time is moved and written to the counter memory B (the second memory) so as to correspond to model number information of respective image forming apparatuses. In other words, the counter information (counter information read the previous time) obtained just before the newest counter information obtained this time from the image forming apparatuses 1 through 5 by the data communication apparatus 7 is written to the counter memory B with the information of date and time of obtaining for respective image forming apparatuses.

The data communication apparatus 7 obtains the counter information from each of the image forming apparatuses 1 through 5. Then, the data communication apparatus 7 compares the counter information obtained this time (each counter information in the counter memory A) with the counter information (each counter information in the counter memory B) which is obtained the previous time and the model number information of the counter information thereof matches the model number information of the image forming apparatuses 1 through 5 from which the counter information is obtained this time. When there is inconsistency between both sets of counter information, the data communication apparatus 7 identifies the inconsistency as the counter abnormality.

That is, in step S35, the data communication apparatus 7 checks whether or not a character other than numbers is included in the counter value represented by each of the counter information obtained from the respective image forming apparatuses 1 through 5.

For example, when a datum such as "001★#3A" is obtained instead of supposed counter information representing a counter value such as "0012345", since characters (symbols in this example) other than numbers are included in the counter value, the data communication apparatus 7 detects the datum as the counter abnormality (data abnormality).

In detecting the counter abnormality, in order to compare the counter information obtained at this time with the counter information obtained the previous time, it is necessary to read the counter information from each of the counter memories A and B. However, it is not necessary to read the counter information from areas in the counter memories A and B corresponding to areas in the parameter memories that do not store the parameters, such as the model number information. For this reason, access to these areas is not performed.

When the counter abnormality is detected (YES in S36), the data communication apparatus 7 immediately calls the central management apparatus 6 informing of the counter abnormality (in this case, a telephone number for an alarm call in the parameter memory is dialed) (step S37). Additionally, the data communication apparatus 7 transmits the counter information obtained this time and the previous time and the model number information of the image forming apparatuses from which the counter information is obtained corresponding to the counter abnormality call information (counter abnormality information), and the date and time of obtaining the counter information (date and time of reception) to the central management apparatus 6 in a data format shown in FIG. 15.

In FIG. 15, the ID code corresponds to the model number information of the above-mentioned image forming apparatuses and the telephone number (identification information) of the data communication apparatus 7. The identification code corresponds to the counter abnormality. The date and time obtained the previous time corresponds to the obtaining date and time of the counter information obtained the previous time. The counter information of the previous time corresponds to the counter information obtained the previous time. The date and time obtained this time corresponds to the obtaining date and time of the counter information obtained this time. The counter information of this time corresponds to the counter information obtained this time. Further, it should be noted that in a case where an image forming apparatus has a plurality of counters for counting the number of formed images, a plurality of areas for the counter information of the previous time and the counter information of this time are also provided.

On this occasion, in a case where, among the counter values represented by the counter information of the respective image forming apparatuses that moved from the counter memory A to the counter memory B, the counter value (previous counter information), the model number of which matches the model number of the image forming apparatuses from which the counter information this time is obtained and the counter information representing the counter value obtained this time includes characters other than numbers, also includes characters other than numbers, the call to the central management apparatus 6 for informing the counter abnormality is not performed. In short, it is prohibited to transmit the counter abnormality call information to the central management apparatus 6. This is because when the counter value represented by the counter information obtained the previous time is an abnormal value, the call should have been already performed informing the central management apparatus 6 that the counter information obtained on the previous day (the previous time) is abnormal. Therefore, making the calls having the same information in a series is avoided so as to reduce communication cost and system load.

In a case where counter information (counter information in the counter memory A) obtained this time does not include characters other than numbers (NO in step S35), the data communication apparatus 7 compares counter information obtained this time with counter information obtained the previous time having model number information that matches the model number information of the image forming apparatuses from which the counter information is obtained this time (step S39). When any of the counter values represented by the counter information obtained this time is smaller than the counter value represented by the counter information obtained the previous time and having the model number information that matches the model number information of the image forming apparatuses from which the counter information is obtained at this time (Yes in step S39), the data communication apparatus 7 determines the counter information as the counter abnormality all the same and immediately calls the central management apparatus 6 so as to inform about the counter abnormality. Additionally, the data communication apparatus 7 transmits the counter information obtained this time and the previous time and the model number information of the image forming apparatuses, from which the counter information is obtained, corresponding to the counter abnormality call information, and the obtaining date and time information of the counter information to the central management apparatus 6 in the data format shown in FIG. 15.

Further, in a case where any of the counter information obtained at this time includes a control code of ASCII, since it is a protocol abnormality, the data communication apparatus 7 calls the central management apparatus 6 so as to inform about the protocol abnormality, and transmits protocol abnormality call information to the central management apparatus 6, though an illustrating thereof is omitted.

In addition, the data communication apparatus 7 calls (dials the telephone number for the counter call in the parameter memory at this moment) the central management apparatus 6 at the counter call reporting time after a monthly closing day for each of the image forming apparatuses in the parameter memory Also, the data communication apparatus 7 transmits the counter information of each of the image forming apparatuses contained in the counter memory C to the central management apparatus 6 as the counter call information (maintenance contract management data).

Furthermore, in transmitting the call information such as the counter abnormality call information to the central management apparatus 6, in a case where the data communication apparatus 7 dials the corresponding telephone number such as the telephone number for the alarm call in the parameter memory and cannot connect with the central management apparatus 6, the data communication apparatus 7 dials the same telephone number again after waiting for a specified waiting time for redialing. Then, in a case where the data communication apparatus 7 still cannot connect with the central management apparatus 6, the data communication apparatus 7 dials the same telephone number again after waiting for the specified waiting time for redialing. The dialing can be repeated until the number of the dialings reaches the number of redialings in the parameter memory.

Figure 16:
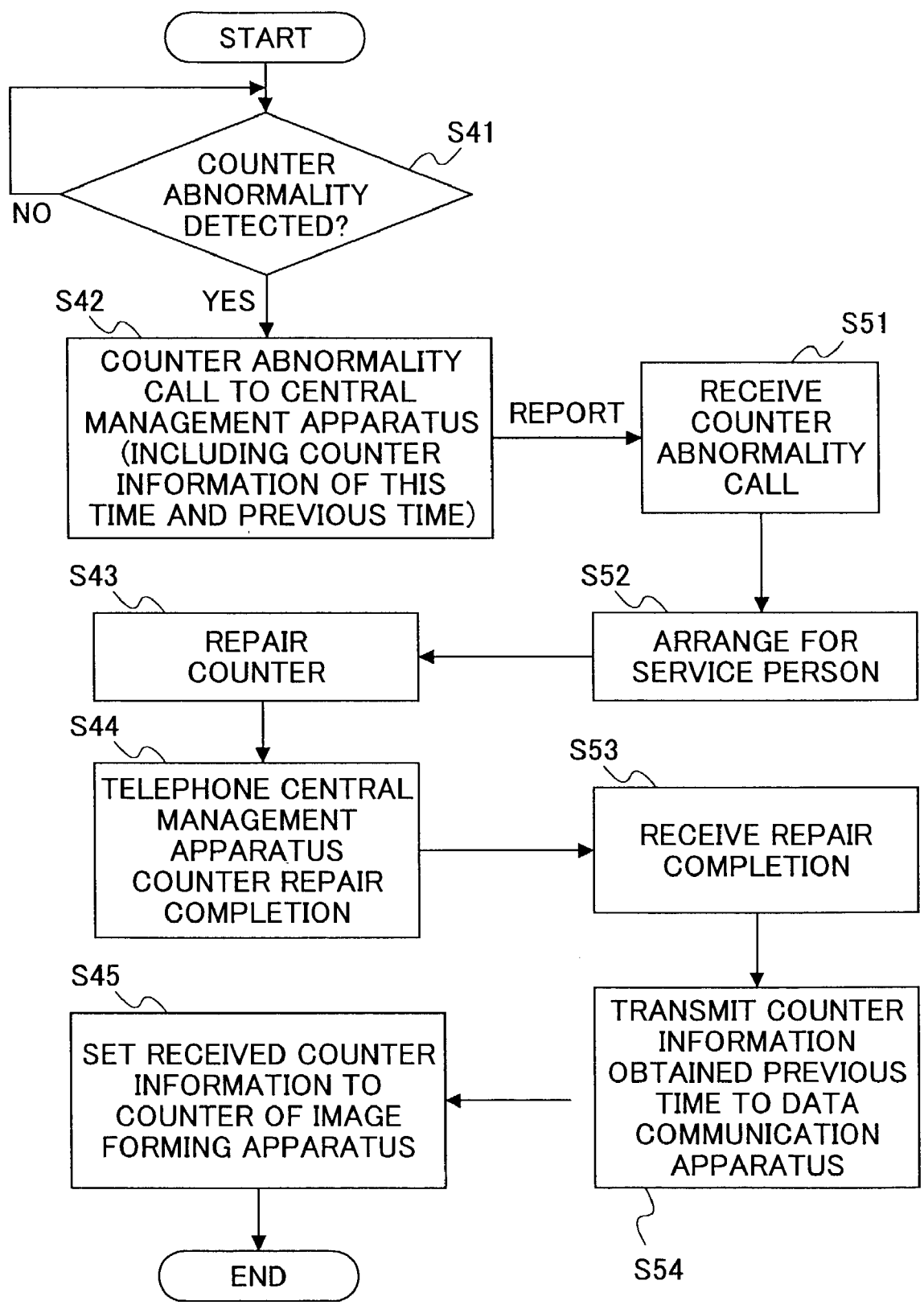
FIG. 16 is a flow chart for explaining an example of interaction between the data communication apparatus 7 and central management apparatus 6 when the data communication apparatus 7 of FIG. 1 detects an abnormality in the counter information.

FIG. 16 is a flow chart for explaining an example of interaction between the data communication apparatus 7 and central management apparatus 6 when the data communication apparatus 7 detects abnormality in the counter information.

When the data communication apparatus 7 detects the counter abnormality (YES in step S41), as mentioned above, the data communication apparatus 7 calls the central management apparatus 6 to inform the central management apparatus 6 of the counter abnormality. Additionally, the data communication apparatus 7 transmits the counter abnormality call information and the information of the date and time of obtaining (date and time of reception) of the counter information to the central management apparatus 6 in the data format as shown in FIG. 15 (step S42). The counter abnormality call information includes the counter information obtained this time and the previous time and the model number information of the image forming apparatuses from which the counter information is obtained.

When the central management apparatus 6 receives the counter abnormality call information from the data communication apparatus 7 (step S51), the central management apparatus 6 writes the counter information and the model number information to the database in the hard disk 105 for each of the image forming apparatuses such that the counter information corresponds to the model number information that is contained in the database and matches the model number information of the counter information. At the same time, the central management apparatus 6 displays the above-described counter information and the model number information as well as the information notifying about the counter abnormality call on the display 104.

According to the displayed information, an operator (center operator) of the central management apparatus 6 arranges for a service person (step S52).

The service person visits the customer who has the image forming apparatus in which, for example, the counter abnormality occurs and repairs (or exchanges) the counter (non-volatile RAM 15) of the image forming apparatus (step S43).

When the service person has completed repairing the counter, the service person telephones the operator of the central management apparatus 6 to inform the operator of the repair completion (step S44).

When the operator of the central management apparatus 6 receives information of the repair completion of the counter (step S53), the operator directs the central management apparatus 6 by operation of a keyboard or mouse (not shown) to remotely set the newest correct counter information (counter information obtained the previous time) to the counter of the image forming apparatus the repair of which is complete.

Thereby, the central management apparatus 6 transmits the counter information setting requirement data to the data communication apparatus 7 to which the above-mentioned image forming apparatus is connected (step S54). The counter information setting requirement data represents setting requirements of, among the counter information written to and contained in the database in the hard disk 105, the newest and correct counter information which should be set to the counter of the image forming apparatus the repair of which is complete and the counter information including the model number information that is contained so as to correspond to the newest and correct counter information.

When the data communication apparatus 7 receives the counter information setting requirement data representing the setting requirements of the counter information including the counter value information and model number information, the data communication apparatus 7 transmits and sets (stores), among the counter information and model number information in the received counter information setting requirement data, the counter information to the image forming apparatus corresponding to the model number information (step S45).

Further, when the central management apparatus 6 receives the counter call information (maintenance contract management data), among the counter information and model number information in the data, the central management apparatus 6 writes the counter information to the database in the hard disk 105 so as to correspond to the model number information that is contained in the database in the hard disk 105 and matches the model number information of the counter information. At the same time, the central management apparatus 6 displays the above-described counter information and model number information as well as the information notifying about the counter call on the display 104.

When the central management apparatus 6 receives the counter call information as mentioned above, the central management apparatus 6 performs an accounting process based on the counter call information and charges the customers of the corresponding image forming apparatuses with maintenance contract fees.

Thus, according to the image forming apparatus management system of this embodiment, the data communication apparatus 7 previously sets the model number information of each of the image forming apparatuses 1 through 5 connected to the data communication apparatus 7 by the requirement from the central management apparatus 6. When the data communication apparatus 7 regularly obtains the counter information representing the values of the counter from each of the image forming apparatuses 1 through 5, the data communication apparatus 7 writes the counter information to the counter memory A (the first memory). Previous to the writing to the counter memory A, the data communication apparatus 7 moves the counter information to the counter memory B (the second memory). The counter information moved is, for the counter information of each of the image forming apparatuses obtained the previous time and already contained in the counter memory A, the counter information that is contained in the counter memory A so as to correspond to the model number information that matches the model number information of the image forming apparatuses from which the counter information is obtained this time. Additionally, the data communication apparatus 7 writes the counter information to the counter memory B for each of the image forming apparatuses so as to correspond to the model number information. Thereafter, the data communication apparatus 7 writes the counter information obtained this time to the counter memory A for each of the image forming apparatuses so as to correspond to the model number information which is previously set and matches the model number information of the image forming apparatuses from which the counter information is obtained this time. At the same time, the data communication apparatus 7 compares the counter information obtained this time with the counter information obtained the previous time and has the model number information that matches the model number information of the image forming apparatuses from which the counter information is obtained this time. When there is contradiction between both sets of counter information (when the counter value represented by the counter information obtained this time is smaller than the counter value represented by the counter information obtained the previous time, or when the counter value represented by the counter information obtained this time includes characters other than numbers), the data communication apparatus 7 determines the counter information to be the counter abnormality. Further, the data communication apparatus 7 transmits the counter abnormality information to the central management apparatus 6 by adding the following information to the counter abnormality information: counter information obtained at this time and the previous time; the model number information of the image forming apparatuses from which the counter information is obtained; and the information of date and time of obtaining of the counter information. Thereby, the central management apparatus 6 can receive the counter abnormality information (including the counter information obtained this time and the previous time, the model number information of the image forming apparatuses from which the counter information is obtained and the information of the date and time of obtaining the counter information), display the received counter abnormality information on the display 104 so as to inform an operator of the counter abnormality information and to make the operator arrange for a service person.

Accordingly, it is possible to quickly repair the counter of the image forming apparatus in which an abnormality occurs. Therefore, even in a case where the abnormality occurs in the counter of the image forming apparatus, the central management apparatus 6 can always charge the customer of the image forming apparatus with an accurate maintenance contract fee. For this reason, it is possible to improve reliability of the system.

In addition, the counter abnormality information received by the central management apparatus 6 also includes the information of the date and time of obtaining the counter information obtained this time and the previous time. Thus, there is a case where cause of the counter abnormality can be specified from the information of the date and time of obtaining. Accordingly, it is possible to reduce labor and time required for repairing (or changing) the counter of the image forming apparatus in which the abnormality occurs.

Additionally, in a case where the data communication apparatus 7 transmits the counter abnormality information by adding the counter information obtained this time and the previous time, the model number information of the image forming apparatuses from which the counter information is obtained and the information of the date and time of obtaining the counter information to the counter abnormality information, and thereafter receives the counter information setting requirement data representing the setting requirements of the counter information including the counter value information and model number information from the central management apparatus 6, it is possible to positively set correct counter information to the counter the repair of which is complete by transmitting the counter information to the image forming apparatus corresponding to the model number information and setting the counter information to the counter thereof.

Further, the counter information contained in each of the counter memories A, B, and C so as to correspond to the model number information before changing the model number information is cleared when the model number information is changed by changing the image forming apparatus. Therefore, it is possible to further improve the reliability of the system since the possibility of transmitting wrong counter information to the central management apparatus 6 is reduced.

Moreover, when the counter abnormality is detected when the counter information obtained this time also includes characters other than numbers following a counter abnormality having been detected in the counter information obtained the previous time, the counter abnormality call information, which represents the counter information obtained the previous time being abnormal, has been already transmitted to the central management apparatus 6. Accordingly, it is possible to reduce the communication cost, and cost and load of the system in total by prohibiting the transmission of the counter abnormality call information of this time.

The present invention is not limited to the specifically disclosed embodiments, and variations and modifications may be made without departing from the scope of the present invention.

The present application is based on Japanese priority application No. 2001-142332 filed on May 11, 2001, the entire contents of which are hereby incorporated by reference.

What is claimed is:

1. A data communication apparatus that has a connecting means that can connect a plurality of image forming apparatuses, each having a counter for counting the number of formed images, regularly obtains counter information representing values of the counters from the image forming apparatuses connected by said means, and regularly transmits, at longer intervals than an interval of obtaining the counter information, the obtained counter information with model number information of the image forming apparatuses from which the counter information is obtained as maintenance contract management data to a central management apparatus that remotely controls the image forming apparatuses through a communication line such as a public circuit, comprising:

model number information setting means for setting the model number information of the image forming apparatuses connected by the connecting means according to a requirement from the central management apparatus;

counter information obtaining means for regularly obtaining the counter information representing the value of the counter from the image forming apparatuses by the connecting means;

a first memory and a second memory storing the counter information obtained by said counter information obatining means for each of the image forming apparatuses so as to correspond to the model number information that is previously set by the model number information setting means and matches the model number information of the image forming apparatuses from which the counter information is obtained;

counter information writing control means for, when obtaining the counter information by the counter information obtaining means, prior to writing the counter information to the first memory, for the counter information of each of the image forming apparatuses obtained a previous time by the counter information obtaining means and already contained in the first memory, moving the counter information contained in the first memory so as to correspond to the model number information that matches the model number information of the image forming apparatuses from which the counter information is obtained this time to the second memory and writing the counter information to the second memory so as to correspond to the model number information thereof for each of the image forming apparatuses, and thereafter writing the counter information obtained this time by the counter information obtaining means to the first memory for each of the image forming apparatuses so as to correspond to the model number information that is previously set by the model number information setting means and matches the model number information of the image forming apparatuses from which the counter information is obtained this time;

counter abnormality detecting means for comparing the counter information obtained this time by the counter information obtaining means with the counter information obtained the previous time, the model number of the counter information thereof matching the model number of the image forming apparatuses from which the counter information is obtained this time, and detecting the counter information as counter abnormality when there is a contradiction between the counter information obtained this time and the counter information obtained the previous time; and counter abnormality information transmitting means for, when the counter abnormality is detected by said counter abnormality detecting means, transmitting counter abnormality information to the central management apparatus with each of the counter information obtained this time and the counter information obtained the previous time obtained by the counter information obtaining means and the model number information of the image forming apparatuses from which the counter information is obtained this time.

2. The data communication apparatus as claimed in claim 1, further comprising:

counter information obtaining time setting means for setting counter information obtaining time for obtaining the counter information from the image forming apparatuses connected by the connecting means according to the requirement from the central management apparatus, wherein, when the counter abnormality is detected by the counter abnormality detecting means, the counter abnormality information transmitting means immediately transmits the counter abnormality information to the central management apparatus with the counter information obtained this time and the counter information obtained the previous time by the counter information obtaining means and the model number information of the image forming apparatuses from which the counter information is obtained this time.

3. The data communication apparatus as claimed in claim 1, wherein the counter abnormality information transmitting means transmits the counter abnormality information to the central management apparatus with the counter information obtained this time and the counter information obtained the previous time by the counter information obtaining means, the model number information of the image forming apparatuses from which the counter information is obtained this time and information of date and time of obtaining said counter information when the counter abnormality is detected by the counter abnormality detecting means.

4. The data communication apparatus as claimed in claim 1, further comprising:

counter information clearing means for, in a case where the model number information is changed by setting of the model number information setting means, clearing the counter information contained in each of the first and second memories that correspond to the model number information before the change.

5. The data communication apparatus as claimed in claim 1, further comprising:

counter information setting means for, after the counter abnormality information transmitting means transmits the counter abnormality information with the counter information obtained this time and the counter information obtained the previous time by the counter information obtaining means, when receiving counter information setting requirement data that represents setting requirements of said counter information including the counter value information and model number information from the central management apparatus, for the counter, value information and model number information in the received counter information setting requirement data, transmitting the counter information to the image forming apparatus corresponding to the model number information and setting the counter value information to the counter.

6. The data communication apparatus as claimed in claim 1, wherein the contradiction between the counter information obtained this time and the counter information obtained the previous time corresponds to a case where the counter value represented by the counter information obtained this time by the counter information obtaining means is smaller than a counter value represented by the counter information obtained the previous time.

7. The data communication apparatus as claimed in claim 1, wherein the contradiction between the counter information obtained this time and the counter information obtained the previous time corresponds to a case where the counter value represented by the counter information obtained this time by the counter information obtaining means includes a character other than numbers.

8. The data communication apparatus as claimed in claim 7, further comprising:

counter abnormality information transmission prohibiting means for prohibiting transmission to the central management apparatus by the counter abnormality information transmitting means in a case where the counter abnormality detecting means detects the counter abnormality when the counter value represented by the counter information obtained this time also includes a character other than numbers in the same way as the counter information obtained the previous time by the counter information obtaining means.

9. A counter information transmission method for a data communication apparatus that has a connecting means that can connect a plurality of image forming apparatuses, each having a counter for counting the number of formed images, regularly obtains counter information representing values of the counters from the image forming apparatuses connected by said means, and regularly transmits the obtained counter information with model number information of the image forming apparatuses from which the counter information is obtained to a central management apparatus that remotely controls the image forming apparatuses through a communication line such as a public circuit, at longer intervals than an interval of obtaining the counter information, wherein, according to a requirement from the central management apparatus, the model number information of the image forming apparatuses connected by the connecting means is previously set, when the counter information representing the value of the counter is regularly obtained from the image forming apparatuses connected by the connecting means, prior to writing the counter information to a first memory, for the counter information for each of the image forming apparatuses obtained at a previous time and already contained in the first memory, the counter information contained in the first memory so as to -correspond to the model number information that matches the model number information of the image forming apparatuses from which the counter information is obtained this time is moved to a second memory and is written for each of the image forming apparatuses so as to correspond to the model number information, thereafter, the counter information obtained this time is written to the first memory for each of the image forming apparatuses so as to correspond to the model number information that is previously set and matches the model number information of the image forming apparatuses from which the counter information is obtained this time, and at the same time, the counter information obtained this time is compared with the counter information obtained the previous time of which the model number information matches the model number information of the image forming apparatuses from which the counter information is obtained this time, the counter information is detected as a counter abnormality in a case where the counter value represented by the counter information obtained this time is smaller than the counter value represented by the counter information obtained the previous time or where the counter value represented by the counter information obtained this time includes a character other than numbers, and counter abnormality information is transmitted to the central management apparatus with the counter information obtained this time and the counter information obtained the previous time, the model number information of the image forming apparatuses from which the counter information is obtained this time, and information of date and time of obtaining said counter information.

10. The counter information transmission method as claimed in claim 9, wherein transmission of the counter abnormality information to the central management apparatus is prohibited in a case where the counter abnormality is detected when the counter value represented by the counter information obtained this time also includes the character other than numbers in the same way as the counter information obtained the previous time.

11. An image forming apparatus management system comprising an image forming apparatus including a counter for counting the number of formed images, a central management apparatus that remotely controls the image forming apparatus, and a data communication apparatus that has a connecting means that can connect a plurality of image forming apparatuses, regularly obtains the counter information representing the values of the counters from the image forming apparatuses connected by said means, and regularly transmits the obtained counter information with model number information of the image forming apparatuses from which the counter information is obtained as maintenance contract management data to the centraL management apparatus that remotely controls the image forming apparatuses through a communication line such as a public circuit at longer intervals than an interval of obtaining the counter information, wherein the central management apparatus comprises:

means for storing a database for containing management data for remotely controlling the data communication apparatus including the model number information of the image forming apparatuses connected by the connecting means of the data communication apparatus;

model number information setting requirement data transmitting means for transmitting model number information setting requirement data including the model number information of the image forming apparatuses connected by the connecting means of the image forming apparatuses and representing setting requirements of the model number information;

maintenance contract management data writing means for, in a case when the maintenance contract management data are received from the data communication apparatus, for the counter information and model number information in the data thereof, writing the counter information for each of the image forming apparatuses to the database so as to correspond to the model number information that is contained in the database and matches the model number information in the maintenance contract management data; and counter abnormality information writing means for, in a case where counter abnormality information is received from the data communication apparatus, for the counter information obtained this time and the counter information obtained a previous time and model number information in the counter abnormality information, writing the counter information to the database so as to correspond to the model number information that is contained in the database and matches the model number in the counter abnormality information, and the data communication apparatus comprises:

model number information setting means for setting the model number information of the image forming apparatuses connected by the connecting means according to a requirement from the central management apparatus;

counter information obtaining means for regularly obtaining the counter information representing the value of the counter from the image forming apparatuses by the connecting means;

a first memory and a second memory storing the counter information obtained by said connecting means for each of the image forming apparatuses so as to correspond to the model number information that is previously set by the model number information setting means and matches the model number information of the image forming apparatuses, from which the counter information is obtained this time;

counter information writing control means for, when obtaining the counter information from the counter information obtaining means, prior to writing the counter information to the first memory, for the counter information of each of the image forming apparatuses obtained the previous time by the counter information obtaining means and already contained in the first memory, moving the counter information contained so as to correspond to the model number information that matches the model number information of the image forming apparatuses from which the counter information is obtained this time to the second memory and writing the counter information to the second memory so as to correspond to the model number information thereof for each of the image forming apparatuses, and thereafter writing the counter information obtained this time by the counter information obtaining means to the first memory for each of the image forming apparatuses so as to correspond to the model number information that is previously set by the model number information setting means and matches the model number information of the image forming apparatuses from which the counter information is obtained this time;

counter abnormality detecting means for comparing the counter information obtained this time by the counter information obtaining means with the counter information obtained the previous time, the model number of the counter information thereof matching the model number of the image forming apparatuses from which the counter information is obtained this time, and detecting the counter information as counter abnormality when there is contradiction between the counter information obtained this time and the counter information obtained the previous time; and counter abnormality information transmitting means for, when the counter abnormality is detected by said counter abnormality detecting means, transmitting the counter abnormality information to the central management apparatus with the counter information obtained this time and the previous time by the counter information obtaining means and the model number information of the image forming apparatuses from which the counter information is obtained this time.

12. The image forming apparatus management system as claimed in claim 11, wherein the central management apparatus comprises counter information obtaining time setting requiring data transmitting means for transmitting counter information obtaining time setting requiring data that represents setting requirements and includes counter, information obtaining time for obtaining the counter information from the image forming apparatuses connected by the connecting means of the data communication apparatus, the data communication apparatus comprises counter information obtaining time setting means for, in a case where the counter information obtaining time setting requiring data is received from the central management apparatus, setting the counter information obtaining time included in the counter information obtaining time setting requiring data, and the counter abnormality information transmitting means of the data communication apparatus for immediately transmitting the counter abnormality information to the central management apparatus with the counter information obtained this time and the counter information obtained the previous time by the counter information obtaining means and the model number information of the image forming apparatuses from which the counter information is obtained this time in a case where the counter abnormality detecting means detects the counter abnormality.

13. The image forming apparatus management system as claimed in claim 11, wherein the counter abnormality information transmitting means of the data communication apparatus transmits the counter abnormality information to the central management apparatus with the counter information obtained this time and the counter information obtained the previous time by the counter information obtaining means, the model number information and information of date and time of obtaining said counter information in a case where the counter abnormality detecting means detects the counter abnormality.

14. The image forming apparatus management system as claimed in claim 11, wherein the data 15 communication apparatus further comprises counter information clearing means for, in a case where the model number information is changed by setting of the model number information setting means, clearing the counter information contained in each of the first and second memories that correspond to the model number information before the change.

15. The image forming apparatus management system as claimed in claim 11, wherein the data communication apparatus comprises counter information setting means for, after the counter abnormality information transmitting means transmits the counter abnormality information with each of the counter information obtained this time and the counter information obtained the previous time by the counter information obtaining means, when receiving counter information setting requirement data that represents setting requirements of said counter information including the counter value information and model number information from the central management apparatus, for the counter information and model number information in the received counter information setting requirement data, transmitting the counter information to the image forming apparatus corresponding to the model number information and setting the counter information to the counter, and the central management apparatus comprises counter information setting requiring data transmitting means for, for the counter information written to and contained in the database by the counter abnormality information writing means, transmitting counter information setting requiring data that represents setting requirements of the counter information including newest and correct counter information and the model number information stored so as to correspond to the counter information.

16. The image forming apparatus management system as claimed in claim 11, wherein the contradiction between the counter information obtained this time and the counter information obtained the previous time of the data communication apparatus corresponds to a case where the counter value represented by the counter information obtained this time by the counter information obtaining means is smaller than the counter value represented by the counter information obtained the previous time.

17. The image forming apparatus management system as claimed in claim 11, where in the contradiction between the counter information obtained this time and the counter information obtained the previous time of the data communication apparatus corresponds to a case where the counter value represented by the counter information obtained this time by the counter information obtaining means includes a character other than numbers.

18. The image forming apparatus management system as claimed in claim 17, wherein the data communication apparatus further comprises counter abnormality information transmission prohibiting means for prohibiting transmission to the central management apparatus by the counter abnormality information transmitting means in a case where the counter abnormality detecting means detects the counter abnormality when the counter value represented by the counter information obtained this time also includes a character other than numbers in the same way as the counter information obtained the previous time by the counter information obtaining means.

* * * * *